US010191164B2

(12) United States Patent
Araki et al.

(10) Patent No.: US 10,191,164 B2
(45) Date of Patent: Jan. 29, 2019

(54) RESIDUAL SEISMIC-RESISTANT PERFORMANCE EVALUATION SYSTEM

(71) Applicants: aLab Inc., Tokyo (JP); E-Globaledge Corporation, Tokyo (JP)

(72) Inventors: Masayuki Araki, Tokyo (JP); Norio Saito, Tokyo (JP); Takao Takahashi, Tokyo (JP)

(73) Assignees: aLab Inc., Tokyo (JP); E-Globaledge Corporation, Tokyo (JP)

( * ) Notice: Subject to any disclaimer, the term of this patent is extended or adjusted under 35 U.S.C. 154(b) by 725 days.

(21) Appl. No.: 14/726,145

(22) Filed: May 29, 2015

(65) Prior Publication Data

US 2015/0260862 A1 Sep. 17, 2015

Related U.S. Application Data

(63) Continuation-in-part of application No. PCT/JP2013/082292, filed on Nov. 29, 2013.

(30) Foreign Application Priority Data

Nov. 30, 2012 (JP) ................................. 2012-263850
Jun. 6, 2013 (JP) ................................. 2013-119657

(51) Int. Cl.
*G01V 1/00* (2006.01)
*G01V 1/18* (2006.01)
(Continued)

(52) U.S. Cl.
CPC ............... *G01V 1/008* (2013.01); *G01M 7/00* (2013.01); *G01V 1/18* (2013.01); *G01V 1/20* (2013.01);
(Continued)

(58) Field of Classification Search
CPC ......... G01V 1/008; G01V 1/242; G01V 1/245
See application file for complete search history.

(56) References Cited

U.S. PATENT DOCUMENTS

2003/0069002 A1* 4/2003 Hunter .................... G09F 27/00
455/404.2
2003/0189136 A1* 10/2003 Maeda ................. B64G 1/1007
244/158.4
(Continued)

FOREIGN PATENT DOCUMENTS

JP 2004-301738 A 10/2004
JP 2011-095237 A * 5/2011
JP 2011-95237 A 5/2011

OTHER PUBLICATIONS

Datta, Seismic Analysis of Structures, John Wiley & Son, Singapore, 2010.*
(Continued)

*Primary Examiner* — Michael Dalbo
(74) *Attorney, Agent, or Firm* — Muncy, Geissler, Olds & Lowe, P.C.

(57) ABSTRACT

A residual seismic-resistant performance evaluation system includes a seismograph including a seismic intensity sensor, a network interface, a storage, an A/D converter, a temporary storage means and a CPU; a data processing terminal for recording and processing measurement data; and a data processing server for evaluating residual seismic-resistant performance based on the measurement data. The system causes the data processing terminal to perform the steps below: a) calculating seismic intensity data based on the measurement data; b) setting a threshold value for the seismic intensity data; determining whether or not the seismic intensity data exceeds the threshold value; and d) transmitting the seismic intensity data exceeding the threshold value to the data processing server. The system causes the data processing server to perform steps below: g) requesting at least one of the seismograph and the data processing terminal to provide the measurement data; and h) receiving the measurement data transmitted according to the request.

17 Claims, 16 Drawing Sheets

(51) Int. Cl.
  *G01V 1/28* (2006.01)
  *G08B 21/10* (2006.01)
  *G01M 7/00* (2006.01)
  *G01V 1/24* (2006.01)
  *G01V 1/20* (2006.01)

(52) U.S. Cl.
  CPC .............. *G01V 1/242* (2013.01); *G01V 1/28* (2013.01); *G01V 2210/70* (2013.01); *G08B 21/10* (2013.01)

(56) References Cited

U.S. PATENT DOCUMENTS

| | | | | |
|---|---|---|---|---|
| 2005/0149296 | A1* | 7/2005 | Sieracki | G06K 9/00523 702/189 |
| 2005/0242943 | A1* | 11/2005 | Matsumoto | G01D 9/005 340/521 |
| 2007/0204046 | A1* | 8/2007 | Batta | H04W 28/08 709/226 |
| 2010/0277334 | A1* | 11/2010 | She | G08B 21/10 340/690 |
| 2011/0019502 | A1* | 1/2011 | Eick | G01V 1/20 367/50 |
| 2012/0253698 | A1* | 10/2012 | Cokonaj | B06B 1/0622 702/39 |

OTHER PUBLICATIONS

International Search Report of PCT/JP2013/082292 dated Jan. 14, 2014.
Office Action of JP Corresponding Application 2013-119657, dated Oct. 8, 2013.
Office Action of JP Application 2014-515396, which is a family member of JP corresponding Application 2012-263850, dated Jul. 15, 2014.

* cited by examiner

RESIDUAL SEISMIC-RESISTANT PERFORMANCE EVALUATION SYSTEM

CROSS REFERENCE

This application is Continuation-In-Part of international application PCT/JP2013/082292 filed on Nov. 29, 2013, which claims priority to Japanese Patent Applications No. 2012-263850 filed on Nov. 30, 2012 and No. 2013-119657 filed on Jun. 6, 2013.

TECHNICAL FIELD

The present invention relates to a residual seismic-resistant performance evaluation system in which a plurality of seismographs placed within a structure such as a road, a building, a bridge or a dam, and a server that manages them, are connected through a network.

BACKGROUND ART

A residual seismic-resistant performance evaluation system is known in which a plurality of seismic intensity sensors such as accelerometers are placed in a civil engineering structure such as a bridge or a building structure (hereinafter referred to as a "structure"), and when an earthquake occurs, the shaking at each portion of the structure is measured. Its seismic intensity data and measurement data on acceleration and the like are transmitted to a management server and the residual seismic-resistant performance of the building is evaluated from the amount of displacement of the building calculated from the measurement data and design data and the like of the structure (Patent Literature 1).

Patent Literature 2 discloses an invention of an earthquake information collection system that collects information on seismic shaking from a large number of widespread dispersed places. In such a system, when information regarding all of the large number of aftershocks following a main earthquake is collected and stored, the amount of data stored in a server and the amount of data processing increase enormously. Hence, it is disclosed that in order for the amount of data to be reduced, a "threshold value" is set for the measurement data to be detected, and only the measurement data which exceeds the threshold value is collected and stored (Paragraphs 8-10).

CITATION LIST

Patent Literature

Patent Literature 1: Japanese Unexamined Patent Application Publication No. 2011-95237
Patent Literature 2: Japanese Unexamined Patent Application Publication No. 2004-301738

SUMMARY OF INVENTION

Technical Problem

By its very nature, a residual seismic-resistant performance evaluation system is required to have such an extremely high reliability that, even when an unprecedented earthquake occurs, it continues to operate without fail. The residual seismic-resistant performance evaluation system needs to be designed and operated such that extremely harsh conditions such as a loss of power or a network disruption are "assumed events." On the other hand, the "residual seismic-resistant performance" significantly differs depending on various factors such as the strength of a structure and the ground. For example, in the case of a structure which is designed with a sufficient earthquake-resistant feature, it can be determined to have no influence on the residual seismic-resistant performance and to be safe under a seismic intensity of 3 without performing the "evaluation." Whereas a dilapidated wooden house or the like may experience some damage even with a seismic intensity 3 earthquake and needs to be evaluated and determined as either safe or dangerous.

In such conditions, when entire measurement data such as acceleration data is continuously transmitted through a network to a management server, even for small earthquakes with no influence on the determination, as the number of seismographs placed in one structure increases, the amount of data transmitted to the management server also extremely increases. In particular, the measurement data necessary for the residual seismic-resistant performance evaluation system to determine the safety or danger of a structure is numerical data that is obtained by A/D conversion of measured values (acceleration, speed or displacement) on all x-, y-, and z-axes acquired by seismic intensity sensors. When the sampling frequency of the seismic intensity sensor is assumed to be, for example, 20 ms, 50 pieces of data per second for one axis need to be recorded and held with the above reliability for a predetermined period without fail. Even for an A/D converter of about 8 bits, in general, this is an extremely large amount of data.

In particular, when a large-scale residual seismic-resistant performance evaluation system is established, though all the measurement data is finally collected from individual places and sent to a data processing server on a cloud, a design with the assumption that the measurement data such as acceleration is continuously transmitted for 24 hours, 365 days a year is not realistic, not only because it causes the load of a network to be increased, but also because a cost for holding the data increases and a high reliability for continuously performing the operation is required when an earthquake occurs.

The present invention is made in view of the foregoing, and has a main technical object to provide a novel mechanism that enables not only to minimize the load of a network between a local side where seismographs are placed and a server side where data is processed and stored through the network in a relatively large-scale residual seismic-resistant performance evaluation system designed to install a large number of seismographs, but also to record and store measurement data necessary for the residual seismic-resistant performance evaluation safely and reliably even during an unprecedented disaster.

Solution to Problem

A residual seismic-resistant performance evaluation system according to the present invention includes: a seismograph that includes a seismic intensity sensor, a network interface, a storage, an A/D converter, a temporary storage means and a CPU; a data processing terminal for recording and processing measurement data acquired by the seismograph; and a data processing server for evaluating residual seismic-resistant performance based on the measurement data acquired by the seismograph, wherein the residual seismic-resistant performance evaluation system causes the data processing terminal to perform the steps below:

a) step of calculating seismic intensity data based on the measurement data acquired by the seismograph (S124);

b) step of setting a threshold value for the seismic intensity data (S125);

c) step of determining whether or not the seismic intensity data exceeds the threshold value (S126); and d) step of transmitting the seismic intensity data exceeding the threshold value to the data processing server (S127), and the residual seismic-resistant performance evaluation system causes the data processing server to perform steps below:

g) step of requesting at least one of the seismograph and the data processing terminal to provide the measurement data (S231); and h) step of receiving the measurement data transmitted according to the request (S232).

In the configuration described above, since the "seismic intensity," which can numerically express the magnitude of the shaking of an earthquake for a series of earthquakes based on an extremely large amount of acceleration data (alternatively, the speed or displacement data) acquired by the seismograph, can be calculated by the seismograph on the local side or the data processing terminal provided on the local side, by setting the seismic intensity threshold values according to the seismic-resistant performance of the structure, the data processing terminal is able to easily determine using the threshold value whether or not the earthquake is an earthquake whose scale is truly necessary for the residual seismic-resistant performance evaluation of the structure. It is possible to easily distinguish whether or not the data needs to be recorded or stored. Moreover, since the seismograph includes the storage and thus a given amount of measurement data is able to be held, it is possible to continuously record and hold the data even if the network is disconnected. Additionally, the step b) of setting the threshold value in the data processing terminal is required to perform only once, and it is not always necessary to make the setting every time.

The timing specified in the step g) at which the measurement data is requested may be either the same time as the seismic intensity data exceeding the threshold value is received (or real time) or the timing afterward (or non-real time). This is because when the network is disconnected, the transmission may be performed after the restoration of the network. Alternatively, that is because, from a different point of view, it can be considered that the measurement data is transmitted to the data processing server collectively in hours such as a night time when communication cost is low.

Incidentally, in general, when a term, "seismic intensity," is simply referred to, as with "magnitude," originally indicating the scale of an earthquake or the like, the term indicates a "seismic intensity scale (or measured/instrumental seismic intensity)" that is published for an earthquake by the Japan Meteorological Agency, and this is a "unique value for each site" calculated from acceleration data by the Japan Meteorological Agency. In this sense, to be exact, the local seismic intensity needs to be distinguished from the "seismic intensity scale". However, in the present specification, when the "seismic intensity" is simply referred to, unless specifically and explicitly indicated, it indicates a seismic intensity (measured seismic intensity) that is determined by calculation from an acceleration value on the local side. This is because the residual seismic-resistant performance evaluation system according to the present invention is a system evaluating the extent of damage to the structure based on the observed value (the measurement data) detected in the structure where the seismic intensity sensor is placed, and it is impossible to assume that the seismic intensity scale announced by the Japan Meteorological Agency is used as the seismic intensity on the local side of the residual seismic-resistant performance evaluation system according to the present invention. For example, however large the officially announced seismic intensity scale is, when the seismic intensity determined from the measurement value detected in the structure itself is low, the probability of damage to the structure is small. Whereas however small the officially announced seismic intensity scale is, a larger seismic intensity of the structure compared to that of the surrounding can be observed in relation to the ground, the shape and size of the structure.

With the assumption of the system of the present invention, it is not always necessary to transmit raw data such as acceleration data acquired by the seismograph on the local side to the side of the server in real time.

Since the locally calculated seismic intensity is used as the threshold value, it is possible to calculate the seismic intensity on the local side and hold the data safely and reliably even when the external network is disconnected.

Herein, the seismic intensity sensor refers to an accelerometer, which may be a speedometer, a displacement meter or the like depending on the situation. The sensor primarily refers to a sensor that detects a physical quantity related to the shaking of an earthquake. The measurement data refers to, for example, measurement data (raw data) recorded by the seismic intensity sensor. For example, when the seismic intensity sensor is an accelerometer, the measurement data may be the time and the acceleration data recorded by the seismograph. The seismic intensity data is, for example, numerical data that indicates the maximum seismic intensity within a unit period. In the configuration described above, since only the seismic intensity data exceeding the threshold value is transmitted to the data processing server, it is possible to reduce the load of the network. In this way, when the seismograph is placed in an area where the network environment is poor, the reduction in the communication cost and the efficient utilization of network resources are facilitated. The seismograph and the data processing terminal in the configuration described above may be mounted in one housing.

Advantageous Effects of Invention

In the residual seismic-resistant performance evaluation system according to the present invention, in normal times, only the seismic intensity data exceeding the threshold value is transmitted to the data processing server, and the measurement data necessary for evaluation of the residual seismic-resistant performance is transmitted only when a request is delivered from the side of the data processing server, with the result that it is possible to significantly reduce the load of the network. Even when an unprecedented disaster occurs, measurement data necessary for the residual seismic-resistant performance evaluation is able to safely and reliably recorded and held.

BRIEF DESCRIPTION OF DRAWINGS

FIG. 10(A) is a diagram showing the seismograph (IT seismograph) and FIG. 10(B) is a diagram showing the data processing terminal;

DESCRIPTION OF EMBODIMENTS

Embodiments of the present invention will be described below with reference to drawings. The same or similar members are identified with the same symbols or the same symbols having different subscripts, their description is not repeated, the description of the embodiments should be interpreted in order to understand the technical ideas of the present invention, and the description of the embodiments should not be interpreted so as to be limited.

(First Embodiment)

Figure 1:
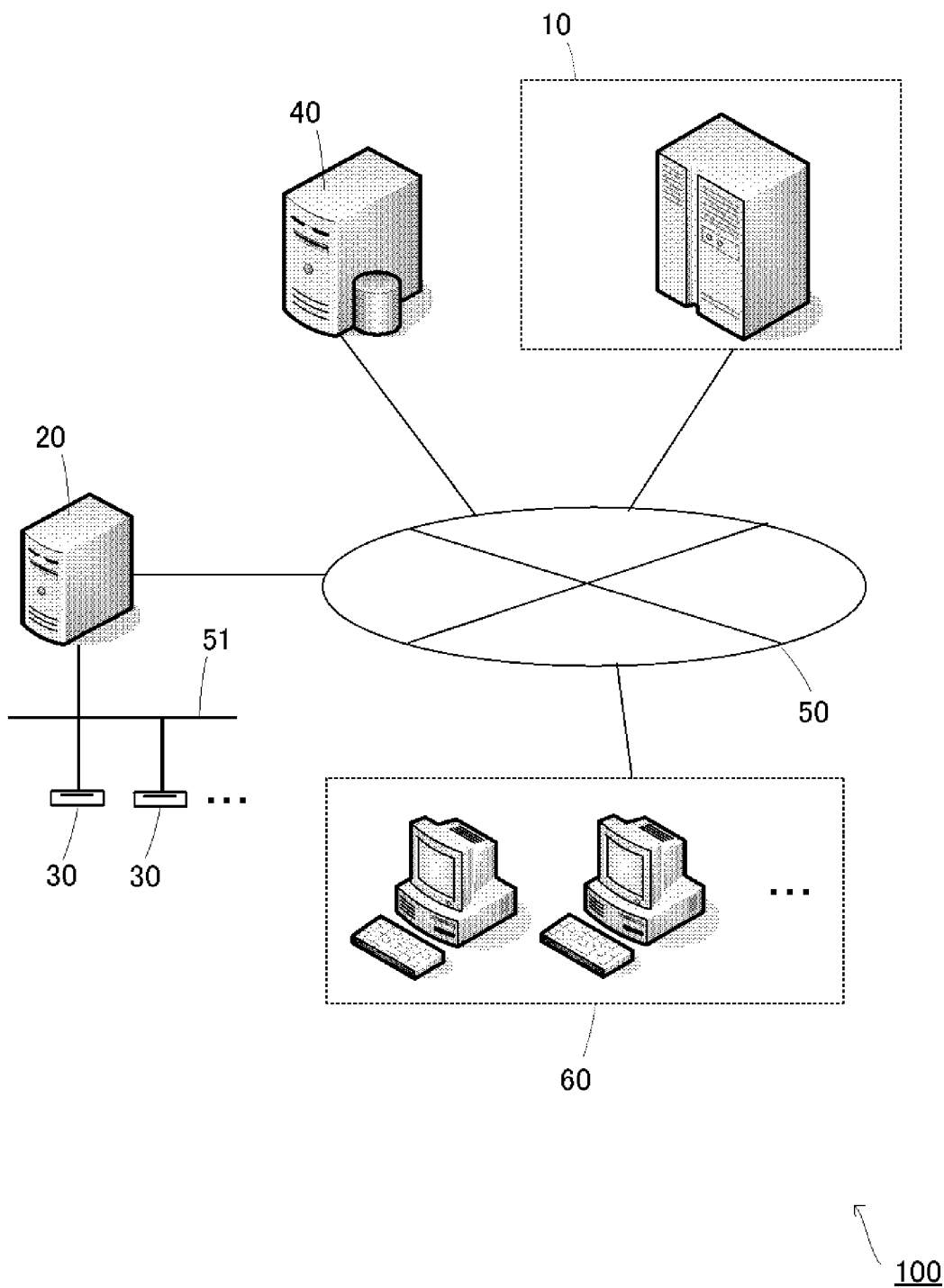
FIG. 1 A diagram showing the residual seismic-resistant performance evaluation system of a first embodiment.

FIG. 1 is a diagram showing a residual seismic-resistant performance evaluation system of a first embodiment. The residual seismic-resistant performance evaluation system 100 includes a data processing server (hereinafter also simply referred to as a "processing server") 10, a data processing terminal (hereinafter also simply referred to as a "processing terminal") 20, a plurality of seismographs 30 and user terminals 60, and they are connected through a network 50. The processing server 10 processes a large amount of data on an earthquake that is transmitted from the processing terminal 20. A storage server 40 records various types of data collected by the processing server 10 and stores necessary certificate data and the like. The data processing server 10 and the storage server 40 are preferably formed with one or a plurality of virtual servers established on a cloud. This is because, on virtual servers on a cloud, it is easy to disperse a load or to transmit the data to a high performance server according to the amount of data processing or the like.

At least two storage servers 40 may be provided, and various types of data (seismic intensity data, threshold value data before and after adjustment, displacement data, stiffness values and residual stiffness values etc.) may be stored in those storage servers. In this way, it is possible to reduce a risk that portions or all of various types of data are lost by a disaster or the like. The portions or all of various types of data may be divided into at least two or more pieces, and the divided pieces of data may be dispersed and stored in the two or more storage servers. In this way, it is possible to reduce damage or a risk in the event that various types of data are illegally leaked, stolen or tampered with.

At least two data processing servers 10 may be provided, and each of the data processing servers may perform residual seismic-resistant performance evaluation processing. In this way, it is possible to reduce a risk that the residual seismic-resistant performance cannot be evaluated due to a defect of the data processing servers, such as damage or a failure, caused by a disaster or the like. The residual seismic-resistant performance evaluation processing may be divided into at least two or more pieces, and the pieces of the processing may be performed distributively in the two or more data processing servers. In this way, it is possible to reduce damage or a risk in the event that the processing programs thereof are illegally leaked, stolen or tampered with.

The data processing server 10 may control the data processing terminal 20. For example, the data processing server 10 may control the stop and the restart of part or all of processing performed by the data processing terminal 20, the updating of usage licenses, the stoppage of usage licenses, and the management of authority and the certificate of a user respectively.

As the network, a secure wireless network (for example, 900 MHz band, Zigbee, registered trademark, to which a VPN or the like is applied), optical communication and the like can be used. That makes it possible to install the network by only simple power construction, instead of incurring an expensive cost for the provision of a wired communication electric facility.

Figure 10A:
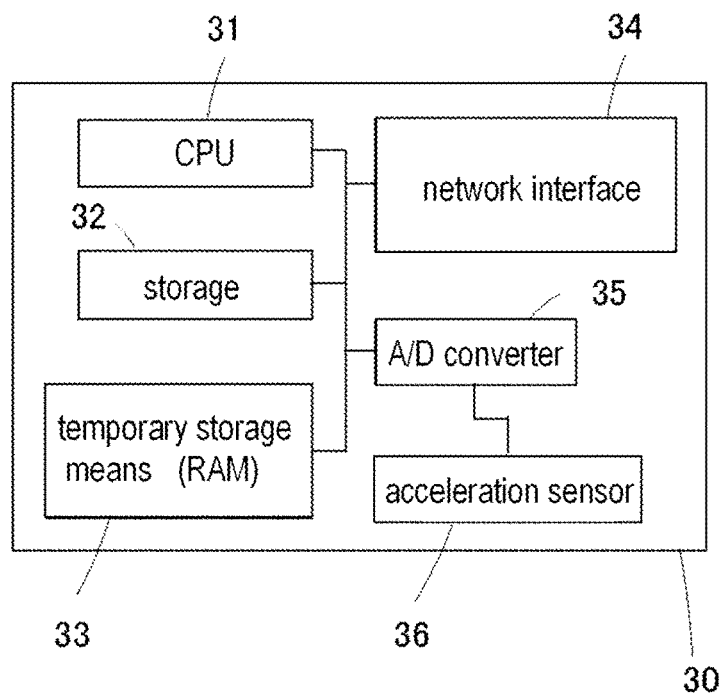
FIGS. 10(A) and 10(B) diagrams showing block configurations of a seismograph (IT seismograph) and a data processing terminal in the residual seismic-resistant performance evaluation system.

FIG. 10(A) shows a block configuration of the seismograph (IT seismograph) 30 that can be connected to the network. The seismograph 30 includes, within one housing, a CPU 31 that controls the entire device, a storage device 32 such as a flash memory or a hard disk, a temporary storage means 33 such as a RAM, a network interface 34, an A/D converter 35 and an acceleration sensor 36, etc. The storage device 32 records programs for measurements and an OS, and stores the calculation results by the CPU 31 as data. The acceleration sensor 36 is connected through the A/D converter 35 to the CPU 31, and transmits the measured values of the acceleration to the CPU 31 while performing sampling on them.

The seismograph 30 incorporates three acceleration sensors 36, and thereby can measure, in real time, accelerations corresponding to three axes that are the horizontal (X-Y directions) axes and a vertical (Z direction) axis. Since the acceleration, the speed and the displacement have a relationship of integration or differentiation, the acceleration sensor 36 may be theoretically a speed sensor or a displacement sensor. A plurality of seismographs 30 having the same configuration are provided for one measurement target (structure). A residual seismic-resistant performance evaluation system that is produced experimentally is assumed to evaluate the residual seismic-resistant performance of one structure with a maximum of about 100 seismographs. However, it is possible to deal with a further large-scale system depending on the enhancement of the terminals and the network. The present invention further achieves its effects as the number of seismographs increases and the amount of data transmitted to the server increases.

Figure 10B:
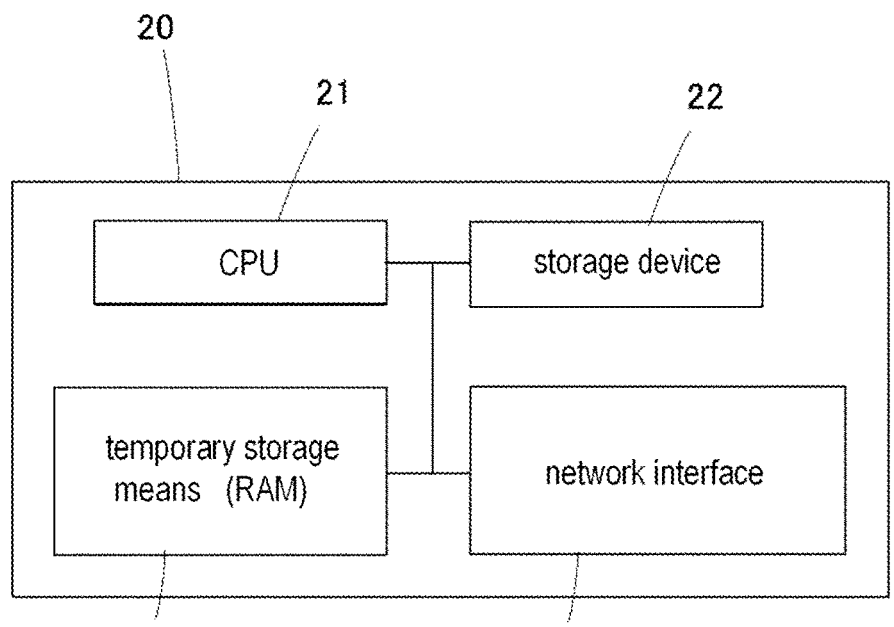

FIG. 10(B) shows a block configuration of the data processing terminal 20. The terminal may be specially designed for this purpose or be prepared by installing a predetermined program for a data processing terminal into a general-purpose computer including a CPU 21, a storage device 22, a RAM 23 and a network interface 24.

For example, the CPU 21 functions to perform a program for producing the seismic intensity data from the acceleration data, as well as a program for providing a predetermined threshold value for the seismic intensity data, recording only necessary data in the storage device 22 and transmitting the data to the data processing server 10. Here, the "seismic intensity data" is a value that indicates the seismic intensity per unit time (for example, every one second) and can be calculated from the measurement result (or the raw data) of the accelerometer. The storage device 22 records an OS and various types of programs and stores the seismic intensity data and the acceleration data. The storage device 22 may naturally be a file server or the like that is provided within a LAN.

The data processing terminal 20 mainly plays a role in managing the seismographs 30, and at least one data processing terminal 20 is provided to one structure where a plurality of seismographs 30 are placed. However, in order for a load to be dispersed, it is practical that at least one of the seismographs 30 is made to have the function of the processing terminal 20, and this one is used as a "master unit" and the other seismographs are used as "slave units." with the result that the processing terminal 20 may be omitted. Alternatively, all the seismographs may have the function of the processing terminal. A storage device 21 included in the seismograph 30 may be a nonvolatile memory device that has a minimum capacity for performing the operation of the device, an even greater capacity hard disk, or a file server or the like that is connected to the network.

The data processing terminal 20 may perform part or all of the processing that is normally performed by the data processing server 10 such as processing for adjusting the threshold value or processing for calculating residual seismic-resistant performance evaluation data, which will be described later. In this way, the load of the data processing server 10 can be reduced. Moreover, even when a problem occurs in the network between the data processing server 10 and the data processing terminal 20 as a result of a disaster or the like, or even when a problem occurs in a power supply on the side of the data processing server 10, as long as there is no problem on the side of the data processing terminal 20, the processing for evaluating the residual seismic-resistant performance can be continuously performed on the terminal side. For example, as the processing period thereof, as long as several to several tens of minutes after the occurrence of the main earthquake are secured, it is practical/acceptable for the invention.

Figure 2:
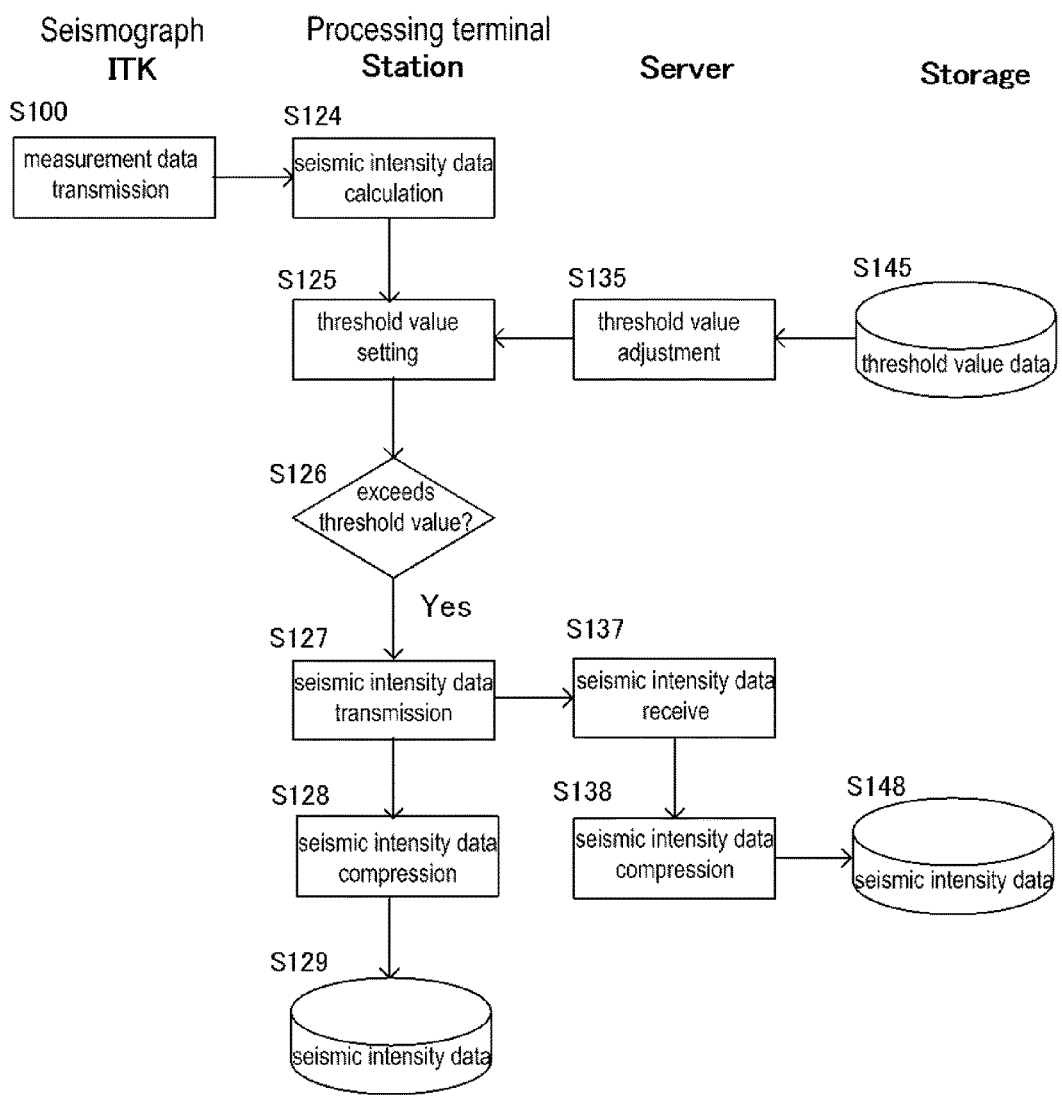
FIG. 2 A flowchart showing processing on seismic intensity data in the first embodiment.

FIG. 2 is a flowchart showing, in the residual seismic-resistant performance evaluation system of the present embodiment, the flow of each step of the seismic intensity data and the exchange of data between the devices. A description will be given for each of the devices.

-Seismograph-
S100: The acceleration data acquired by the acceleration sensor is sequentially transmitted to the data processing terminal.

-Data Processing Terminal-
S124: The acceleration data transmitted from the seismograph is received to produce the seismic intensity data.

S125: The threshold value for the seismic intensity data is set.
S126: The seismic intensity data is compared with the threshold value.
S127: When the seismic intensity data exceeds the threshold value, the seismic intensity data is transmitted to the data processing server.
S128: The seismic intensity data is compressed.
S129: The compressed seismic intensity data is stored.
The above mentioned "a date processing terminal" is often called "station" in actual business transactions. The term "station" in some figures is used an alias of "a date processing terminal."

-Data Processing Sever and Storage Server-
S135: The threshold value set in the data processing terminal is adjusted.
S137: The seismic intensity data transmitted by the data processing terminal in step S127 is received.
S138: The seismic intensity data is compressed.
S145: The threshold value data is transmitted to the data processing terminal.
S148: The compressed seismic intensity data is recorded. The storage server 40 may be a memory device such as HDD.

Namely, in the data processing terminal 20, the threshold value for the seismic intensity data is previously set. This threshold value is configured such that the threshold value is adjusted (S135) by the data processing server 10 based on the data (S145) recorded in the storage server 40 and that this is set (S125) in the data processing terminal 20. Then, only the seismic intensity data that exceeds the threshold value is transmitted to the processing server 10. For example, only when a seismic intensity of 3 or more is recorded, the seismic intensity data thereof is to be transmitted to the processing server 10. Preferably, this threshold value can be adjusted. As an operation when the seismic intensity data does not exceed the threshold value, any operation may be adopted. In actuality, for example, a configuration may be adopted such that, on the side of the processing terminal 20, the seismic intensity data which-exceeds the threshold value is stored permanently, and that the seismic intensity data which is the threshold value or less is stored for a given period and is sequentially overwritten in chronological order. With consideration given to the amount of data processing, the performance of the data processing terminal 20 and the like, the seismic intensity data and the measurement data may be compressed on the side of the data processing terminal 20 before the transmission to the data processing server. The seismic intensity data and the measurement data may be stored without being compressed if necessary. In this case, it is advantageous to omit a decompression step when a reading request is made.

As described above, thanks to providing the threshold value for the seismic intensity data, the amount of data between the data processing terminal 20 and the data processing server 10 is significantly decreased. Furthermore, it contributes to a reduction in the amount of calculation for evaluating the residual seismic-resistant performance by the data processing server 10.

In the residual seismic-resistant performance evaluation system 100 of the first embodiment, even when the number of seismographs 30 is increased, and a large amount of measurement data measured by the seismographs 30 is collected in the data processing terminal 20, since only the data which exceeds the threshold value is transmitted as the seismic intensity data to the data processing server 10, the loads of the data processing server 10 and the data processing terminal 20 are reduced, with the result that only the necessary data of the measurement data measured by the seismographs 30 is stored. This also contributes to a reduction of the calculation amount that is required for calculating the residual seismic-resistant performance by the data processing server 10.

(Second Embodiment)

Figure 3:
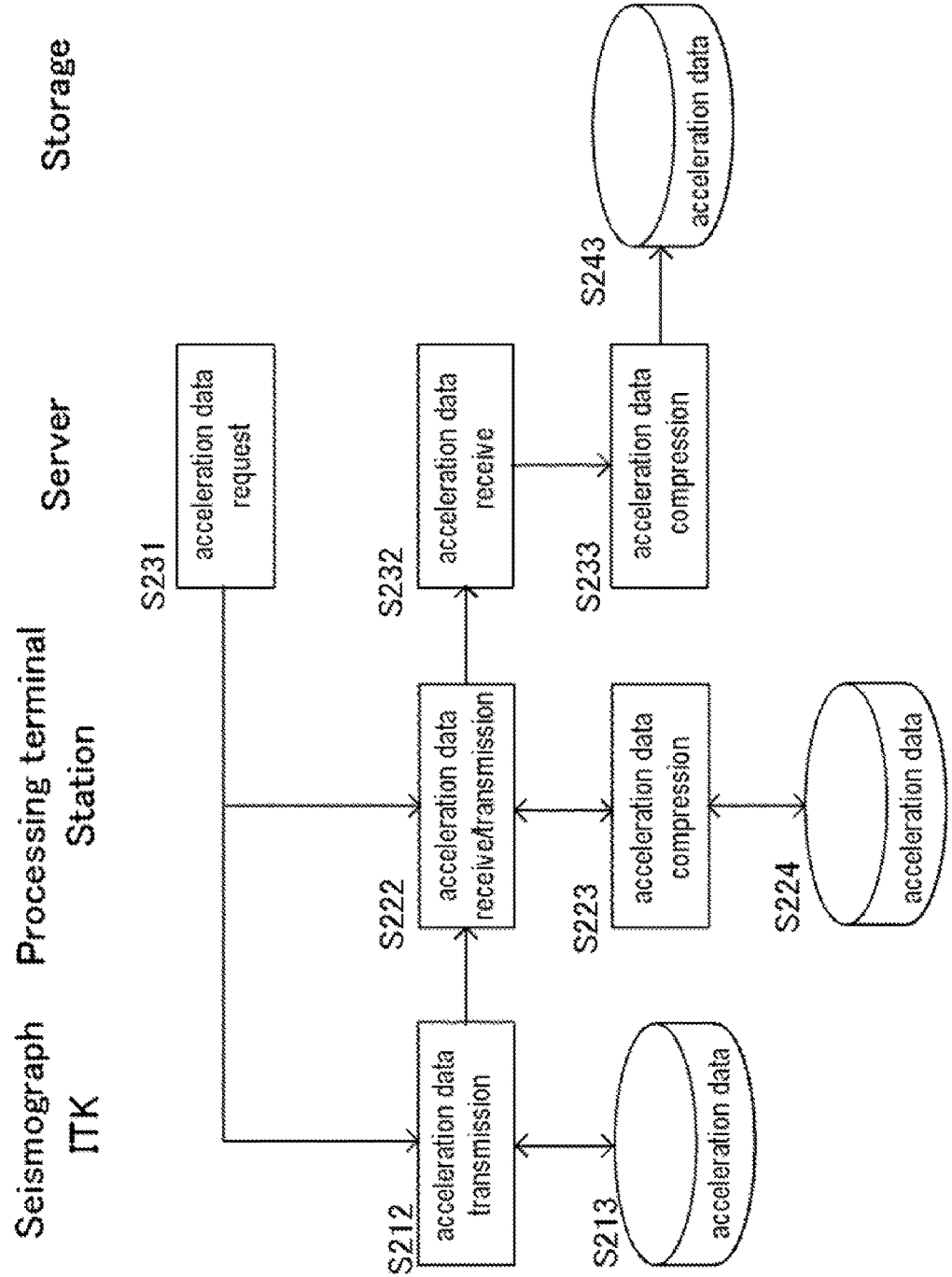
FIG. 3 A flowchart showing processing on seismic intensity data in a second embodiment.

FIG. 3 is a diagram showing a flowchart of a processing program for measurement data. In the present embodiment, it represents the flow of the steps from the request of the measurement data (raw data) measured by the seismographs to the acquisition thereof and the exchange of data between the devices, in order for the data processing server 10 to determine the evaluation of the residual seismic-resistant performance. As in the first embodiment, a description will be given for each of the devices.

-Data Processing Sever-

S231: The processing server requests the seismograph and the processing terminal or both of them to provide the acceleration data.

S232: Acceleration data receive

S233: Acceleration data compression

-Seismograph-

S212: The request of the acceleration data from the processing server is received, and thus the acceleration data is transmitted to the processing terminal.

S213: The acceleration data is recorded in the seismograph.

-Data Processing Terminal-

S222: The request of the acceleration data from the processing server is received, and thus the acceleration data is transmitted to the processing server.

S223: The acceleration data is compressed.

S224: The acceleration data is recorded.

-Storage Server-

S243: Acceleration data is recorded.

Since, in principle, it is sufficient that the data processing server 10 requests the data processing terminal 20 to provide the acceleration data, the data processing server 10 does not always need to transmit a request signal for the acceleration data to the seismograph. However, when the seismograph can process the request signal for the acceleration data from the data processing server 10, or when the seismograph includes a storage device which can record the acceleration data, steps S212 and S213 may be performed (in preparation of unexpected data loss or network disconnection).

Steps S222 to S224 on the side of the data processing terminal may be performed periodically, for example, about once per day. In this way, the data processing server acquires, in real time, for example, the seismic intensity data for an earthquake whose seismic intensity is recorded as 3 or more, whereas acceleration data having a large amount of data can be advantageously acquired collectively in non-real time such as hours of which communication traffic is small.

In the residual seismic-resistant performance evaluation system of the second embodiment, the loads of the data processing server 10 and the data processing terminal 20 are reduced, and thus it is possible to efficiently acquire and store the measurement data such as the acceleration data measured by the seismographs 30.

(Third Embodiment)

Figure 4:
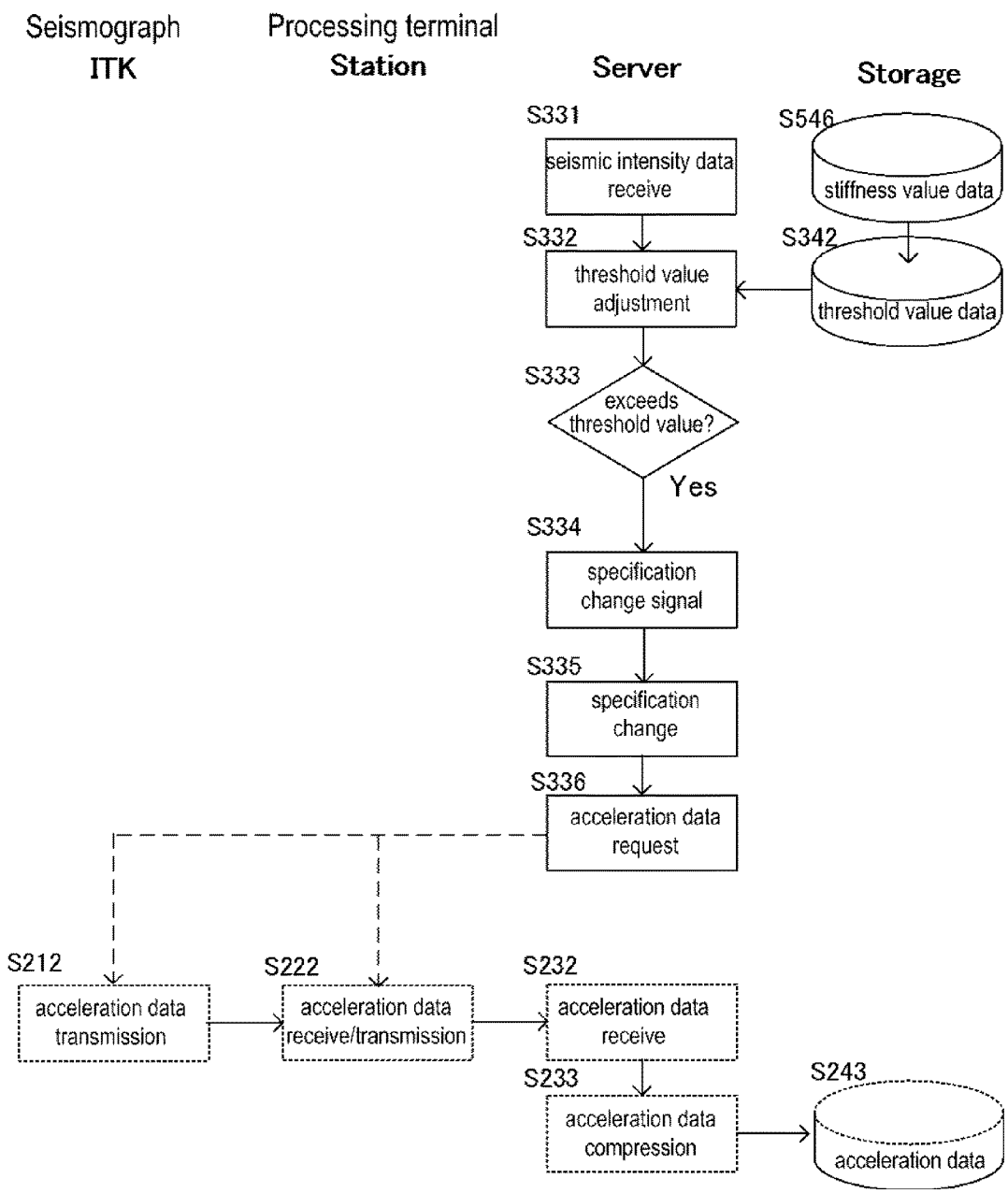
FIG. 4 A flowchart showing processing on seismic intensity data in a third embodiment.

FIG. 4 is a diagram showing a flowchart of a processing program for measurement data in the third embodiment. In the present embodiment, with the assumption that the data processing terminal observes seismic intensity data which exceeds the threshold value, the operation of each device when a major earthquake is actually observed will be described.

-Data Processing Sever-

S331: The seismic intensity data is received from the data processing terminal.

S332: The threshold value is adjusted.

S333: The seismic intensity data is compared with the threshold value.

S334: A data processing server specification change signal is generated.

S335: A data processing server specification is changed.

S336: The acceleration data is requested.

Steps S334 and S335 are steps of changing the specification of the data processing server which will perform the data processing according to the processing amount by the data processing server. When the quaking with large seismic intensity is observed for a long period, the specification of the data processing server (specification of virtual CPU performance, virtual memory size etc.) is changed to be high prior to the start of the processing because the calculation amount for evaluating the residual seismic-resistant performance is expected to increase. Since an operation after the acceleration data is requested in step S336 can be performed with reference to the processing described in the second embodiment, it is indicated by broken lines. Herein, the processing after steps S212 and S222 is omitted.

In the processing described above, when seismic intensity data which exceeds the threshold value is detected, the specification of the data processing server 10 is changed, thus the processing performance is enhanced and thereafter the acceleration data is requested, with the result that it is possible to prepare for the subsequent processing.

(Fourth Embodiment)

Figure 5:
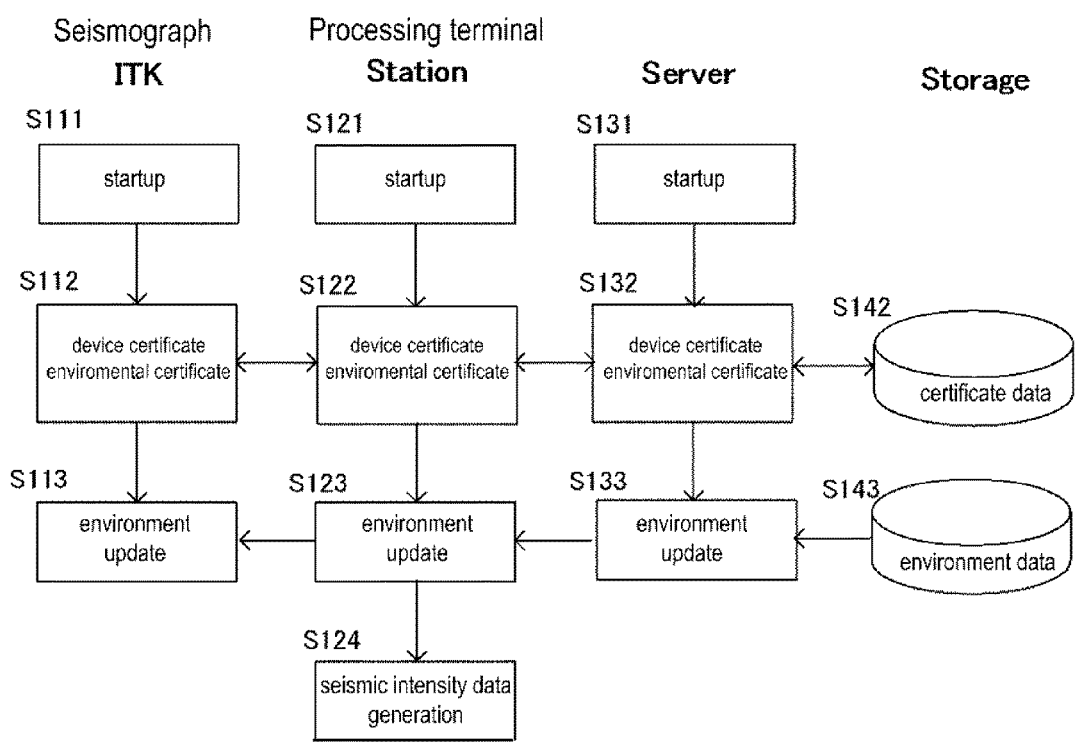
FIG. 5 A flowchart of an integrated certificate program in a fourth embodiment.

FIG. 5 is a diagram showing a flowchart of an integration certificate program. FIG. 5 shows operations of the data processing server 10, the data processing terminal 20, the seismograph 30 and the storage server 40 at the startup time.

Operations of the seismograph, the processing terminal and the server perform device certificate and environmental certificate are shown. Data for the personal certificate, the device certificate and the environmental certificate are held in the storage server 40, and thus it is possible to check if each device is placed under appropriate conditions. Steps S111, S121 and S131 are steps at the startup time, and steps S112, S122 and S132 are steps for the device certificate and the environmental certificate. In the device certificate, an ID that is unique to the device may be used for certification. When the data processing server, the data processing terminal or the seismograph is not certified as a result of any one of the certifications being performed, steps (S133, S123, S113) of updating environments may be further executed in this order based on environmental certificate data stored in the storage server. Namely, the updating step (S133) for the data processing server is executed first. The updating step (S123) for the data processing terminal is executed the next. The updating step (S113) for the seismograph is executed the last. In the environmental certificate, a white list such as a software list or a setting list may be used for the certification. In the storage server 40, the certificate data and environmental data are stored, and read as necessary. The environmental data is used at the time of update if the environmental certificate has not passed. As necessary, the personal certificate may be further performed on each device by using a user name such as that of a responsible person or a management company.

In an actual operation, for example, the following aspects can be considered:

(1) An organization or a corporation that certifies an operator who performs placement, installation, periodic maintenance and calibration or the like of the seismograph in order to performs placement certificate on the seismograph is present, (2) An organization or a corporation that certifies an operator who performs placement or the like of the seismograph in order to perform placement certificate on the seismograph, and (3) The operator receiving the placement certificate of the seismograph performs placement or the like of the seismograph.

In this case, the personal certificate corresponds to the certificate by the organization or the corporation that performs placement certificate of the seismograph. As the personal certificate, the certificate of the user may be applied in the data processing server, and the certificate of the placement operator may be applied in the data processing terminal and the seismograph.

As described above, the integrated certificate program is performed for each device, and thus its utilization is allowed only for the data processing server 10, the data processing terminal 20 and the seismograph 30 that are certificated. Even when one of the data processing server 10, data processing terminal 20 and seismograph 30 is not certificated, the utilization for all the devices is not allowed, and thus it is possible to bring it into a state where it cannot be used. This integrated certificate program is performed by the CPU of at least one of the data processing server 10, the data processing terminal 20 and the seismograph 30 based on the certificate data stored in the storage server 40.

When the data processing server 10, the data processing terminal 20 or the seismograph 30 is not certificated by the environmental certificate at the time of startup, based on the environmental data stored in the storage server 40, the integrated certificate program updates the environments of the data processing server 10, the data processing terminal 20 and the seismograph 30 in that order, with the result that the data used for the environmental certificate, for example the white list, may be updated.

At that time, by recording the updated information, it is possible to leave, in a trusted (reliable) state, the detection, the distribution, the application confirmation and the trail of an update program. Furthermore, the certificate data may be added to the updated information.

After certification by the integrated certificate program described above, the processing program for the seismic intensity data described above is performed.

As described above, all the data processing server 10, the data processing terminal 20 and the seismograph 30 perform, at the startup time, the integrated certificate program for performing the device certificate and the environmental certificate, and thus it is possible to ensure that safety in each device is enhanced and it is operated in an appropriate environment. In this way, the personal certificate, the device certificate and the environmental certificate are performed on all the devices that are utilized, and thus it is possible to establish an extremely highly reliable environment. Preferably, in particular, in order for the reliability of the certificate and the tamper-resistance to be acquired, each device is mounted in a housing that is robust, highly reliable and safe, and the network is configured with a secure communication network such as a VPN. In this way, a system that is closed as much as possible is formed, and thus it is possible to enhance the tamper-resistance of the entire system. Moreover, as described above, the system that is closed as much as possible is formed, and thus it is possible to form a trusted system.

In the device certificate, any key such as a PKI, a MAC address, an IP address and the like are used singly or in combination, and thus it is possible to certify that it is the required terminal. In the environmental certificate, it is certified that the software and the hardware of the respective terminal are not falsified. Finally, the person who uses it or the person who places it is certified.

(Fifth Embodiment)

Figure 6:
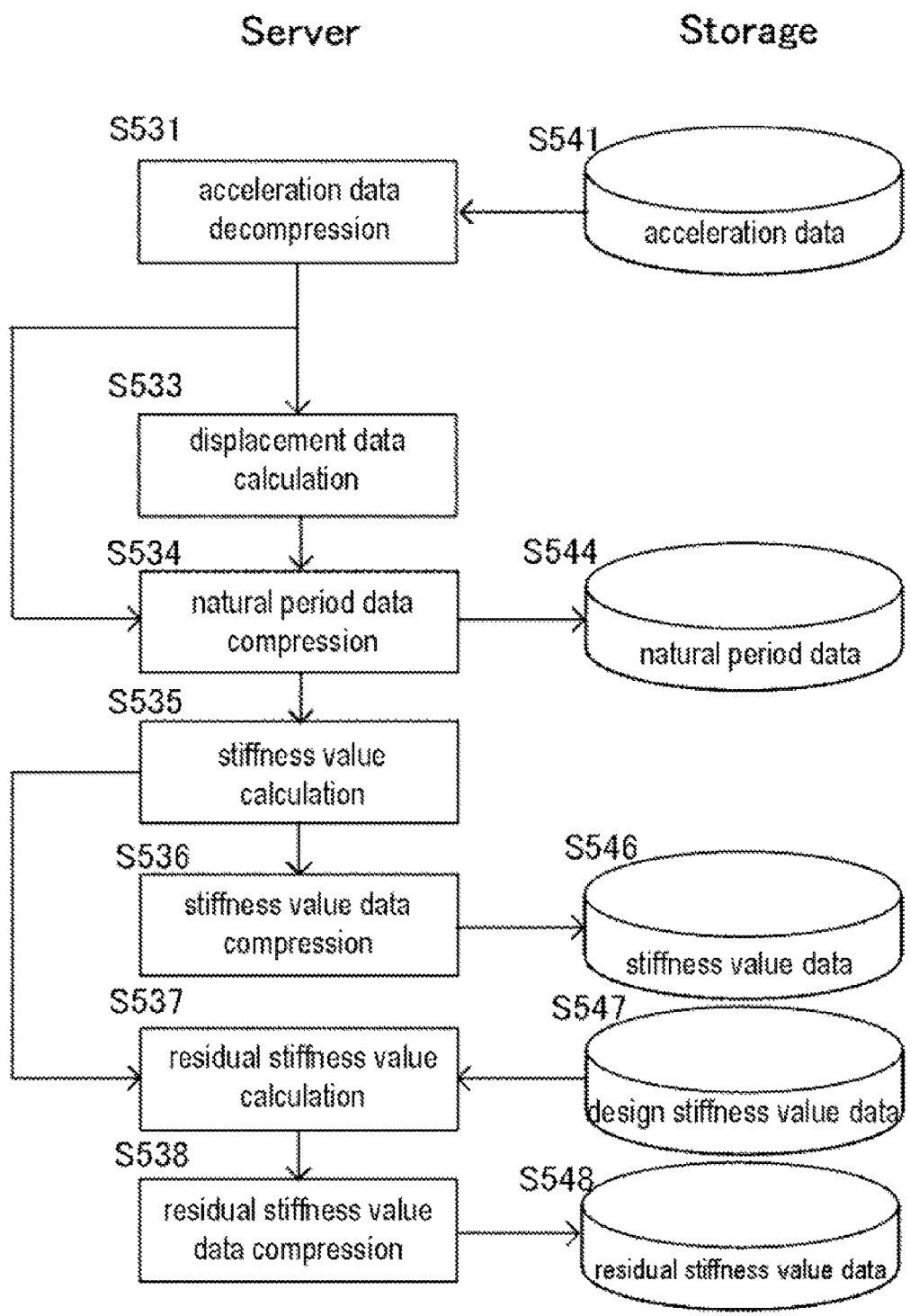
FIG. 6 A flowchart showing the calculation of residual seismic-resistant performance evaluation data in a fifth embodiment.

FIG. 6 is a flowchart showing a method of calculating the residual seismic-resistant performance evaluation data. As shown in FIG. 6, a residual seismic-resistant performance evaluation data calculation performs steps S531 to S538 to calculate the stiffness value and the residual stiffness value of the structure for evaluating the residual seismic-resistant performance.

The data processing server 10 first decompresses the acceleration data stored in the storage server 40 (S531 and S541). Then, based on the acceleration data, the displacement data is calculated (S533). Then, a natural period value is calculated from the acceleration data and the displacement data, and the data of the natural period value is compressed (S534) and stored in the storage server 40 (S544). Then, the stiffness value is calculated from the natural period value (S535). Then, the data of the stiffness value is compressed (S536) and stored in the storage server 40 (S536 and S546). The residual stiffness value is calculated from the stiffness value (S537). Then, the data of the residual stiffness value is compressed (S538) and stored in the storage server 40 (S548). By the steps described above, it is possible to calculate the stiffness value and the residual stiffness value of the structure for evaluating the residual seismic-resistant performance (S535 and S537) and to store it in the storage server 40 (S546 and S548). The calculated stiffness value and the residual stiffness value of the structure are compared, and thus it is possible to evaluate the residual seismic-resistant performance.

Specifically, the stiffness value is derived by the following flow: a P curve (performance curve) is derived from the acceleration data, an S curve (skeleton curve) is determined therefrom and a stiffness curve is derived therefrom. The skeleton curve is a curve that indicates, for example, how a building is deformed by the application of a force in the east-west direction of the structure, and is expressed, for example, with the vertical axis representing the stress and the horizontal axis representing the displacement in the east-west direction. When the displacement of the structure falls within the elastic limit, the skeleton curve is a straight line passing through the origin point, whereas when it exceeds the elastic limit, the line is bent, and the inclination of the straight line after that point is decreased. This method is advantageous in easily determining the stiffness of a building from the actually measured value as compared with a conventional method of performing a large-scale simulation based on design data and information on the materials of the building and the like.

A method of evaluating the residual seismic-resistant performance other than that described above or a plurality of algorisms may be used. The method of evaluating the residual seismic-resistant performance or the algorisms may be processed by either or both of the data processing server 10 and the data processing terminal 20. Furthermore, the method of evaluating the residual seismic-resistant performance or the algorisms may be switched and selected according to the request and the purpose of the user.

(Sixth Embodiment)

Figure 7:
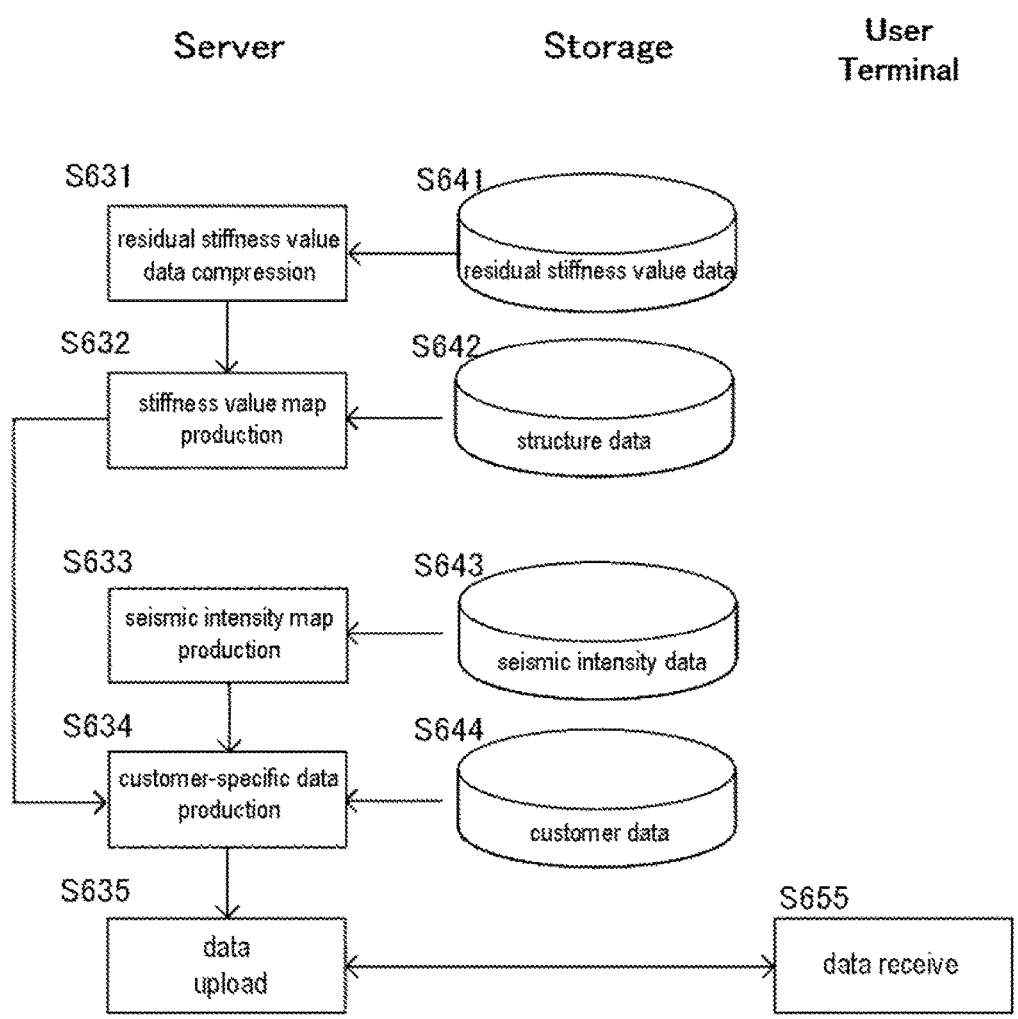
FIG. 7 A flowchart showing a map production in a sixth embodiment.

FIG. 7 is a flowchart showing a map production method in a sixth embodiment. In the present embodiment, a map production step, in which the data processing server uses the stiffness value and the residual stiffness value of the structure, is further included. Each step of S631 to S635 shown in FIG. 7 is performed by the data processing server, and thus a map on the stiffness value of the structure and a map on the residual stiffness value of the structure are produced.

First, based on the stiffness value calculated in step S631, the residual stiffness value calculated by S537 described above and the design data (S642) on the structure previously stored in the storage server 40, a stiffness value map of the structure is produced (S632). If there is no design data on the structure, reinforcement work or the like is considered at a timing when the stiffness value is decreased by about a given value, for example 10% with respect to the initial stiffness value, or at a timing when a variation in the stiffness value becomes equal to or more than a measurement error. Then, the seismic intensity data (S643) compressed and stored in the storage server 40 is decompressed and is displayed on the map, and thus a seismic intensity map is produced (S633). Then, based on customer data (S644) stored in the storage server 40, the stiffness value map of the structure and the seismic intensity map produced are produced for each customer (S634). Thereafter, data on the stiffness value map and the seismic intensity map produced for each customer is uploaded to a server for disclosing it to the network 50 (S635). Steps S631 to S635 described above are performed, and thus it is possible to produce the stiffness value map and the seismic intensity map for each customer and to disclose the data thereon to the network 50. The data uploaded to the server can be utilized by access from the user terminal 60 (S655). In the access described above, the integrated certificate program may be used.

The users of the user terminal 60 may be classified into two or more groups, and thus for each of the classified groups, accessible data on the stiffness value map, the seismic intensity map and the like may be controlled. For example, the users may be divided into three groups, that is, a group of the owners of the structures, a group of real estate management companies and building/maintenance companies, and a group of local governments and relevant ministries and agencies, and for each of the groups, the range of data which can be accessed, browsed and acquired may be set.

Alternatively, when a plurality of individuals and businesses such as the owners, the administrative managers, the maintenance managers and the maintenance work operators of the structures are involved, they may be divided into groups, and for each of the groups, the range of data which can be accessed, browsed and acquired may be set.

(Seventh Embodiment)

Figure 8:
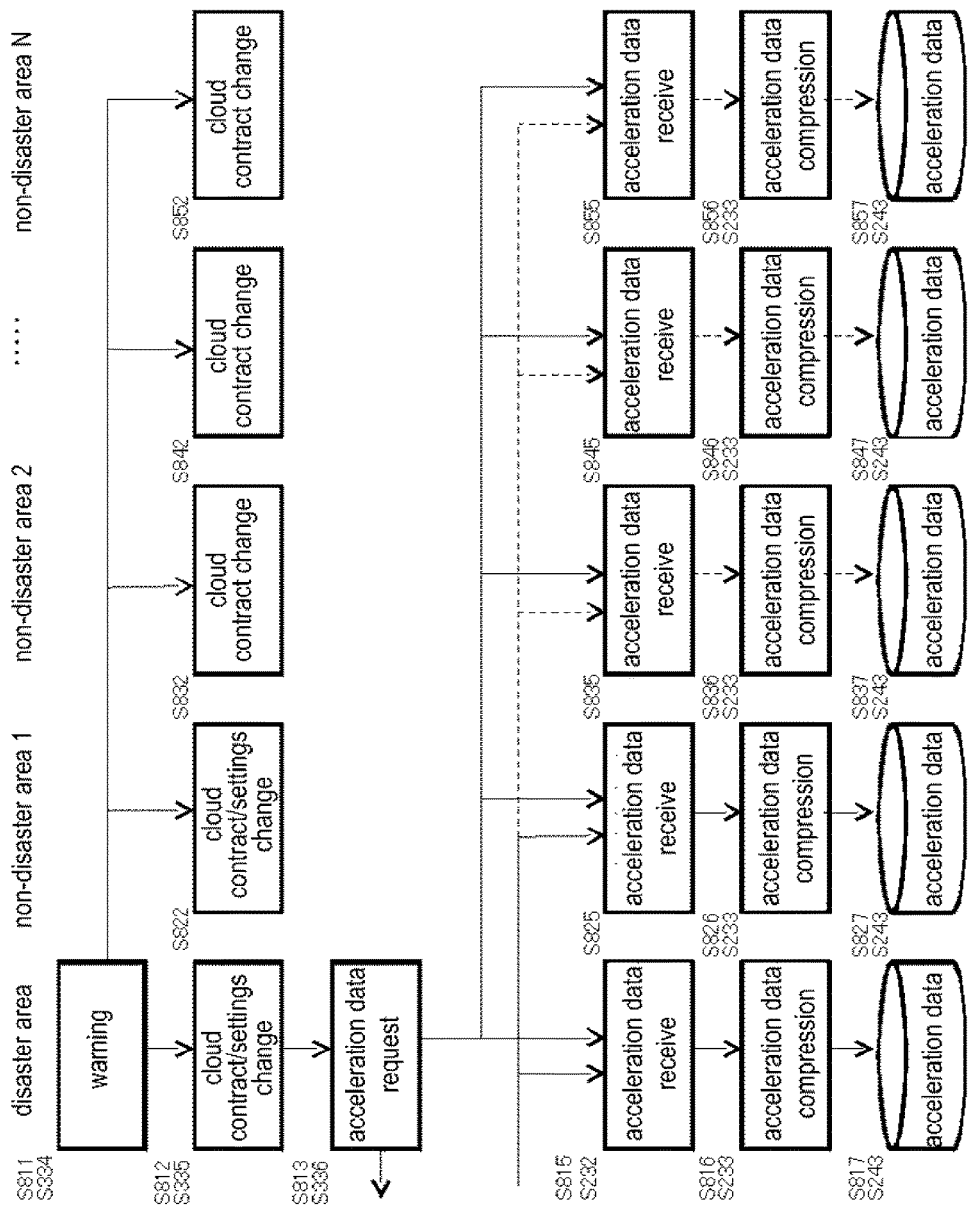
FIG. 8 A diagram showing the residual seismic-resistant performance evaluation system of a seventh embodiment.

FIG. 8 is a diagram showing the flow of the individual sites of a residual seismic-resistant performance evaluation system according to a seventh embodiment. This system is established in a disaster area, a non-disaster area 1, a non-disaster area 2, . . . and a non-disaster area N, and a cloud is used as the data processing server of each area. The acceleration data is divided for each of the areas and is stored in the storage device of the cloud. When the cloud is used as the data processing server, it is possible to advantageously and flexibly change, in a relatively short time, calculation processing performance and the capacity which the storage device can store.

In order to store the acceleration data on the disaster area in the storage device of the cloud, a warning is first issued to a cloud (hereinafter referred to as the "cloud of a disaster area") in charge of the disaster area (step S811). In step S811, as necessary, warnings may be issued to clouds (hereinafter referred to as the "clouds of the non-disaster area 1, the disaster area 2, . . . and the non-disaster area N") in charge of the non-disaster area 1, the disaster area 2, . . . and the non-disaster area N. Then, the contract and the settings of the cloud of the disaster area are changed (step S812). Here, as necessary, the contract and the settings of the clouds of the non-disaster area 1, the disaster area 2, . . . and the non-disaster area N may be changed (steps S822 to S852). Steps S811 and S812 described above correspond to step S334 and S335 described above. Then, the cloud of the disaster area requests the seismograph or the data processing terminal of an unillustrated disaster area to provide the acceleration data (step S813). Step S813 described above corresponds to step S336 described above. Then, the acceleration data transmitted from the unillustrated seismograph or data processing terminal is received (step S815), the received acceleration data is compressed (step S816) and the compressed acceleration data is stored in the storage device of the cloud of the disaster area (step S817). Steps S815, S816 and S817 respectively correspond to steps S232, 233 and 243.

When the acceleration data on the non-disaster area 1, the disaster area 2, . . . and the non-disaster area N is stored in the storage device of the cloud, each cloud requests the seismograph or the data processing terminal of each unillustrated area to provide the acceleration data, the acceleration data transmitted from the seismograph or the data processing terminal of each area is received (steps S825 to S855), the received acceleration data is compressed (steps S826 to S856) and the compressed acceleration data is stored in the storage device of the cloud of the disaster area (steps S827 to S857).

In the residual seismic-resistant performance evaluation system of the seventh embodiment, the contract and the settings of the cloud are changed for each area, and thus it is possible to store the acceleration data in the storage device of the cloud of each area.

(Eighth Embodiment)

Figure 9:
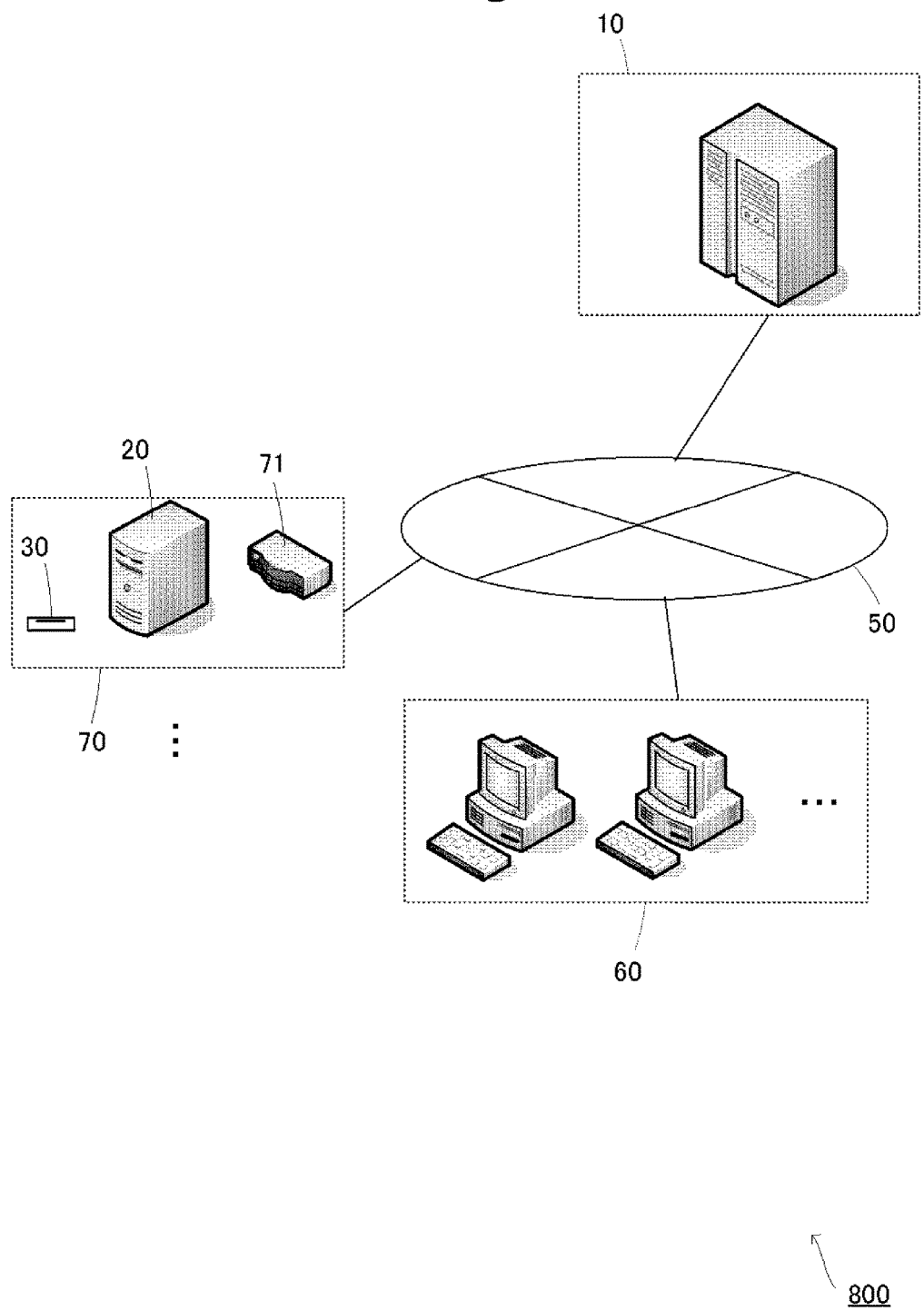
FIG. 9 A diagram showing the residual seismic-resistant performance evaluation system of an eight embodiment.

FIG. 9 is a diagram showing the residual seismic-resistant performance evaluation system of an eight embodiment. In the residual seismic-resistant performance evaluation system described above, the seismograph and the data processing terminal may be integrated. The residual seismic-resistant performance evaluation system 800 includes the data processing server 10, an integration terminal 70 in which the data processing terminal 20, the seismograph 30 and a communication module 71 are mainly integrated, and the user terminals 60, and they are connected through a network. By using the integration terminal 70 described above, it is not necessary to perform network settings for the data processing terminal and the seismograph or to adjust the data processing terminal and the seismograph on the spot, with the result that it is easy to perform installation work. When the integrated certificate is performed, it is not necessary to certify the data processing terminal and the seismograph, and thus it is easy to perform the certification.

In the residual seismic-resistant performance evaluation system 800 of the eight embodiment, it is possible to easily perform the network settings and the placement operation because the integration terminal 70 in which the data processing terminal and the seismograph are integrated is used.

(Ninth Embodiment)

Figure 11:
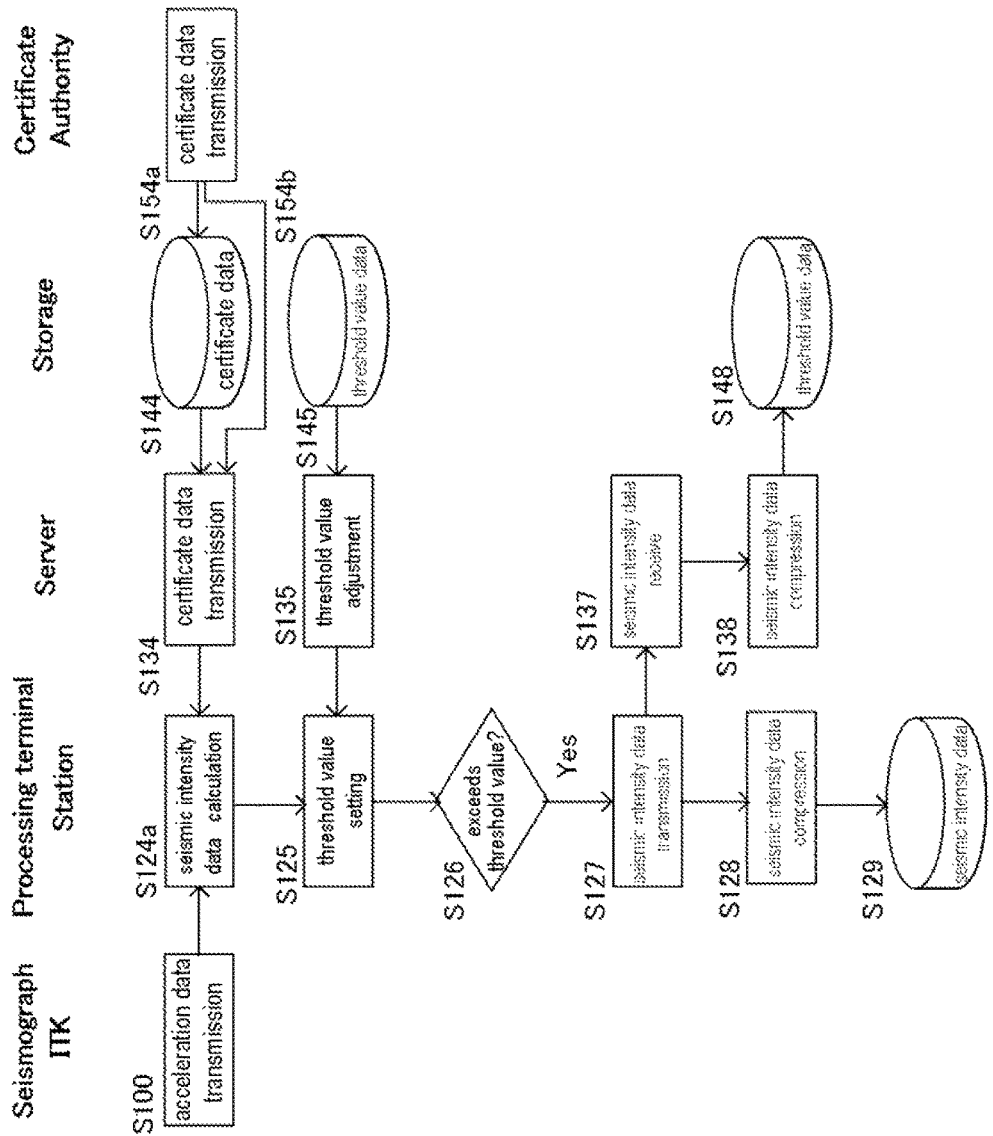
FIG. 11 A flowchart showing processing of seismic intensity data in a ninth embodiment.
Figure 12:
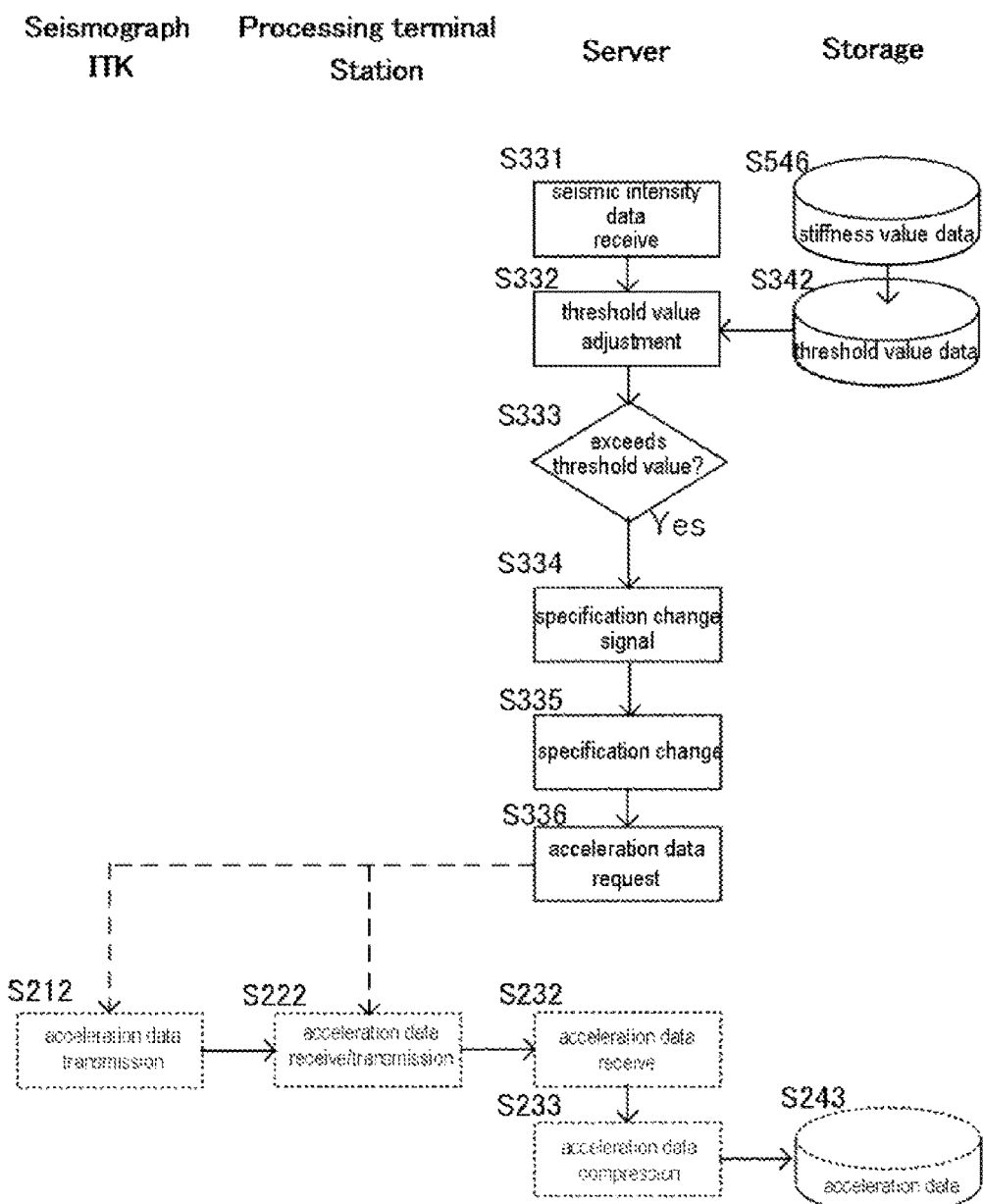
FIG. 12 A flowchart showing processing performed by the data processing server of the ninth embodiment.

FIG. 11 is a flowchart showing processing of the seismic intensity data in a ninth embodiment. FIG. 12 is a flowchart showing processing that is mainly performed by the data processing server of the ninth embodiment. In the residual seismic-resistant performance evaluation system described above, as shown in FIGS. 11 and 12, a certificate authority (CA) is newly provided, and certificate data transmitted from the certificate authority may be added to the measurement data (the acceleration data) and/or calculated data (the seismic intensity data). Processing for adding the certificate data to the seismic intensity data will be described below.

-Data Processing Terminal-

S124a: The acceleration data transmitted from the seismograph is received, the seismic intensity data is calculated, the certificate data transmitted from the data processing server is received and thereafter the certificate data is added to the seismic intensity data.

-Data Processing Server/Storage Server-

S134: The certificate data is transmitted to the data processing terminal S144: The certificate data is transmitted to the data processing server.

-Certificate Authority (CA)-

S154a: The certificate data is transmitted to the storage server.

S154b: The certificate data is transmitted to the data processing server.

As described above, the certificate authority is newly provided, and thus it is possible to easily perform various certifications. The certificate data that is added to the seismic intensity data is used to perform the certification, and thus it is possible to enhance the reliability and the safety of the seismic intensity data.

In step S124a described above, the certificate data may be added to the acceleration data transmitted from the seismograph 30, and thereafter the seismic intensity data may be generated.

The certificate data transmitted by the certificate authority may include not only the data for the personal certificate, the device certificate and the environmental certificate described in the fourth embodiment, but also data for a time certificate.

Each of the data processing server 10, the data processing terminal 20, the seismograph 30 and the storage server 40 may include a TPM (Trusted Platform Module), and the certificate data of the certificate authority may be stored in the TPMs. The TPM is a security chip that has a mechanism for mainly protecting information from an act of illegally analyzing internal information, and has not only the function of safely storing an electronic key (the key of the PKI) and an electronic certificate, but also the function of certificating the validity of a platform and the function of encrypting the data. At least one of the server, the terminal and the device may include the TPM that stores the certificate data of the certificate authority.

The certificate authority described above may be an external certificate authority that serves as a TTP (Trusted Third Party).

In the residual seismic-resistant performance evaluation system of the ninth embodiment, the certificate authority (CA) is newly provided, and thus it is possible to easily perform various certifications, and the certificate data of the certificate authority is added to the seismic intensity data, the certificate data is used to perform the certification and thus it is possible to more enhance the reliability and the safety of the seismic intensity data.

(Tenth Embodiment)

Figure 13:
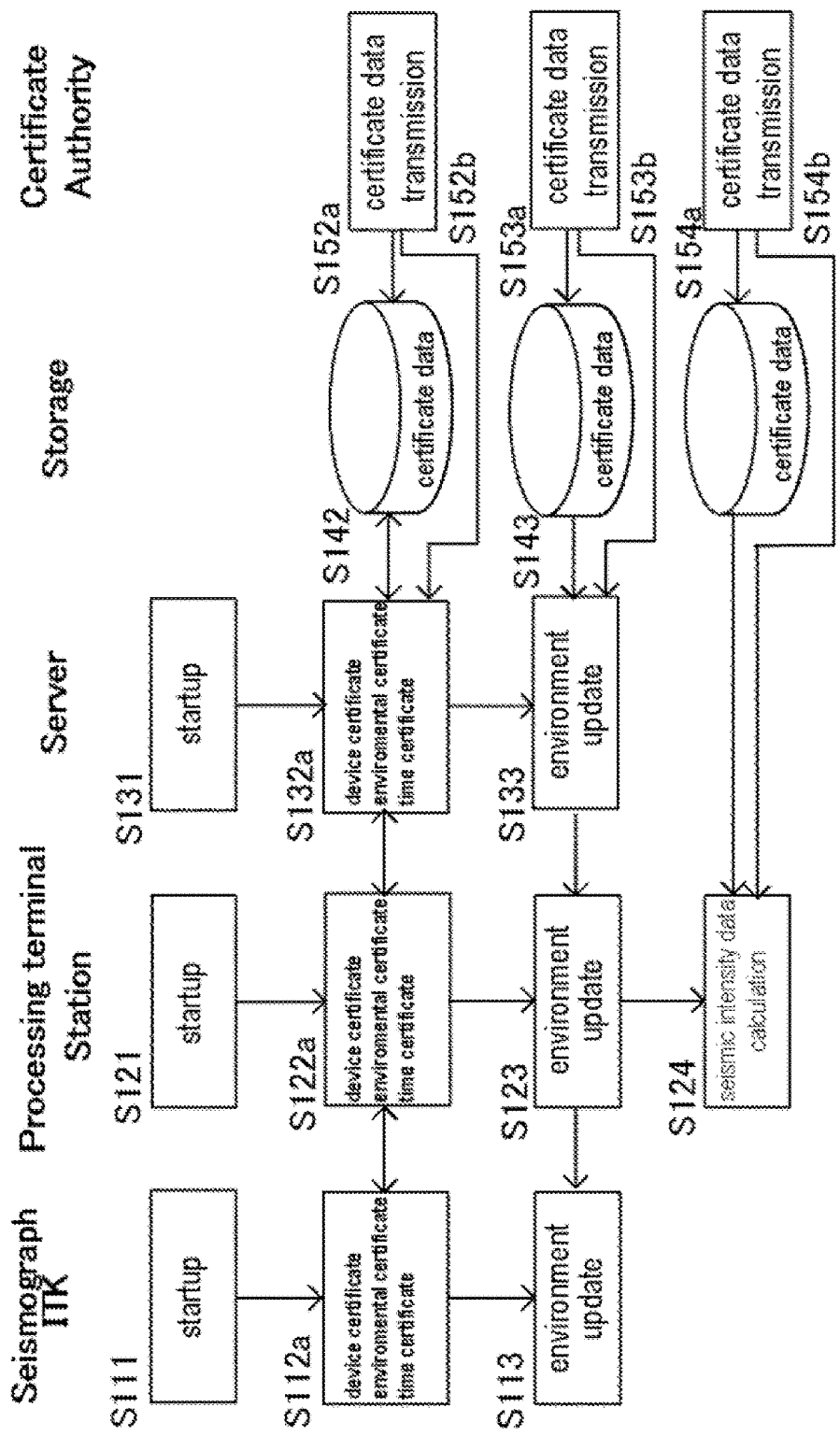
FIG. 13 A flowchart of an integration certificate program in a tenth embodiment.

FIG. 13 is a flowchart of the integrated certificate program in a tenth embodiment. In the residual seismic-resistant performance evaluation system of the ninth embodiment described above, the certificate data transmitted from the certificate authority (CA) may be used to perform each certification (the personal certificate, the device certificate, the environmental certificate and/or the time certificate). FIG. 13 shows how the integrated certificate performs the personal certificate, the device certificate, the device certificate, the environmental certificate and the time certificate when each of the data processing server 10, the data processing terminal 20, the seismograph 30 and the storage server 40 starts up.

Each of steps S111, S121 and S131 shown in FIG. 13 indicates a step at the time of the startup, and each of steps S112a, S122a and S132a indicates a step of the device certificate, the environment certificate and the time certificate. Each of steps S152a, S153a and S154a indicates a step of transmitting the certificate data (the data for the personal certificate, the device certificate, the environment certificate and the time certificate) generated in the certificate authority to the storage server 40. Each of steps S152b and S153b indicates a step of transmitting the certificate data to the data processing server 10, and step S154b indicates a step of transmitting the certificate data to the data processing terminal 20. The individual steps described above are performed, and thus in a residual seismic-resistant performance evaluation system of the tenth embodiment, the certificate data generated in the certificate authority is held in each device, and specifically each of the data processing server 10, the data processing terminal 20, the seismograph 30 and the storage server 40 holds the data for the personal certificate, the device certificate, the environment certificate and the time certificate, and the certification is performed with the certificate data, with the result that it is possible to check if each device is installed under appropriate conditions.

The integrated certificate including the personal certificate, the device certificate, the environment certificate and the time certificate may be performed mutually between all the data processing server 10, the data processing terminal 20, the seismograph 30, the storage server 40 and the certificate authority.

The integrated certificate described above may be performed in every lapse of predetermined time (periodically) after the startup of the data processing server 10, the data processing terminal 20, the seismograph 30 and the storage server 40.

The residual seismic-resistant performance evaluation system 1000 of the tenth embodiment uses the certificate data of the certificate authority to perform the integrated certificate, and thus it is possible to easily ensure that each device has enhanced reliability and safety and is operated in an appropriate operating environment.

(Eleventh Embodiment)

Figure 14:
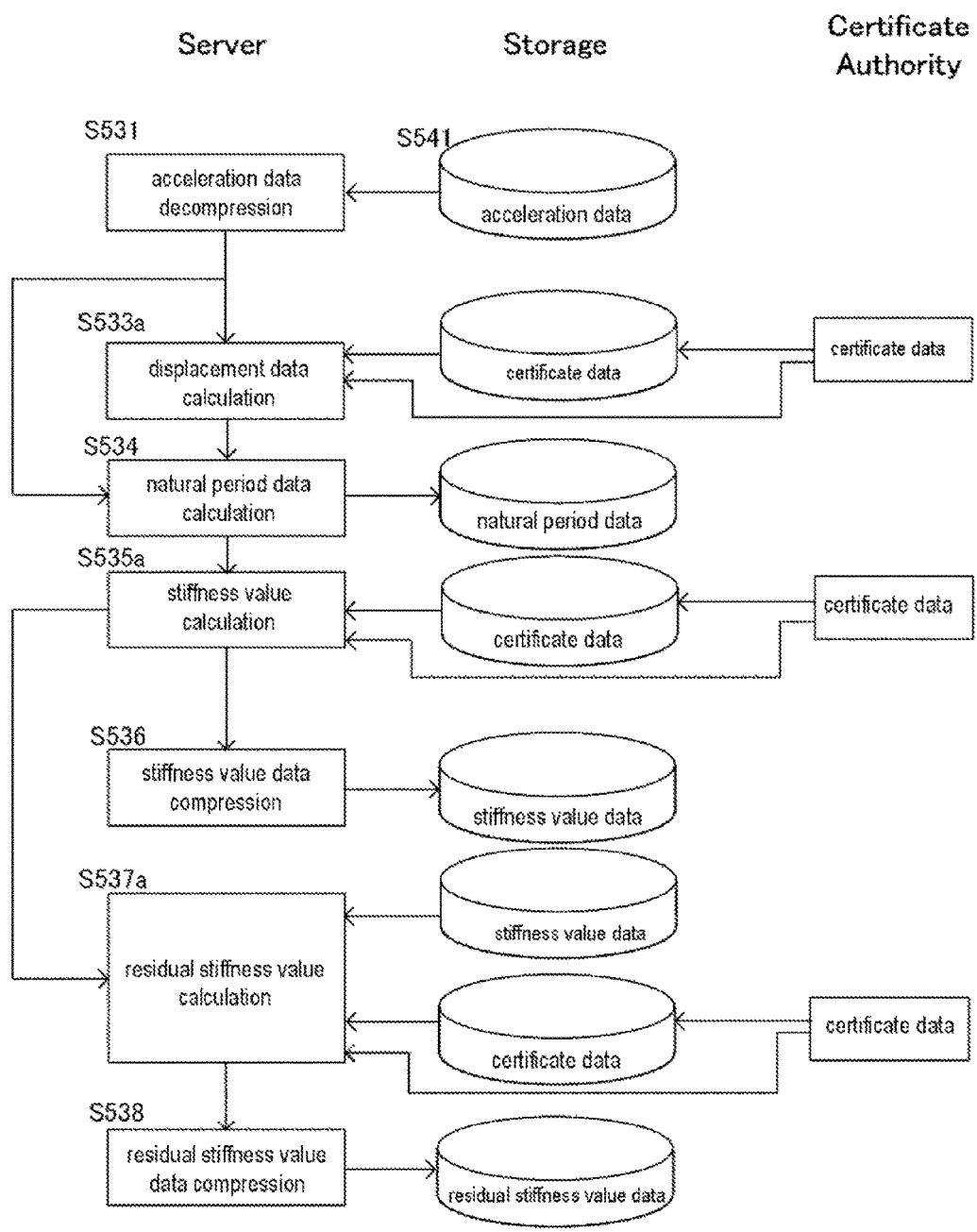
FIG. 14 A flowchart showing the calculation of residual seismic-resistant performance evaluation data in an eleventh embodiment.

FIG. 14 is a flowchart showing the calculation of residual seismic-resistant performance evaluation data in an eleventh embodiment. In the ninth and tenth embodiments of the residual seismic-resistant performance evaluation system, the certificate data of the certificate authority may be added to at least one value of the measurement value of the acceleration data, the displacement data and calculated values, such as the stiffness value and the residual stiffness value of the structure for evaluating the residual seismic-resistant performance. Processing for adding the certificate data to each piece of data will be described below.

As shown in FIG. 14, a residual seismic-resistant performance evaluation data calculation means adds the certificate data to the acceleration data or the calculated displacement data when the displacement data is generated (S533a). Thereafter, when the stiffness value is generated, the certificate data is added to the calculated stiffness value (S535a). Thereafter, when the residual stiffness value is generated, the certificate data is added to the calculated residual stiffness value (S537a). The residual seismic-resistant performance evaluation system of the eleventh embodiment compares the generated stiffness value of the structure with the residual stiffness value, and thereby can evaluate the residual seismic-resistant performance, and uses the certificate data added to each piece of data to perform the certification, and thereby can enhance the reliability (authenticity assurance and admissibility of evidence), the safety, the availability and the efficiency of each piece of data and the administrative quality of the entire IT assets relating to the present system.

In the residual seismic-resistant performance evaluation system 1100 of the eleventh embodiment, the certificate data of the certificate authority is added to at least one value of the acceleration data, the displacement data, the stiffness value of the structure for evaluating the residual seismic-resistant performance and the residual stiffness value, and the certificate data is used to perform the certification, with the result that it is possible to even further enhance the reliability and the safety of each piece of data.

(Twelfth Embodiment)

Figure 15:
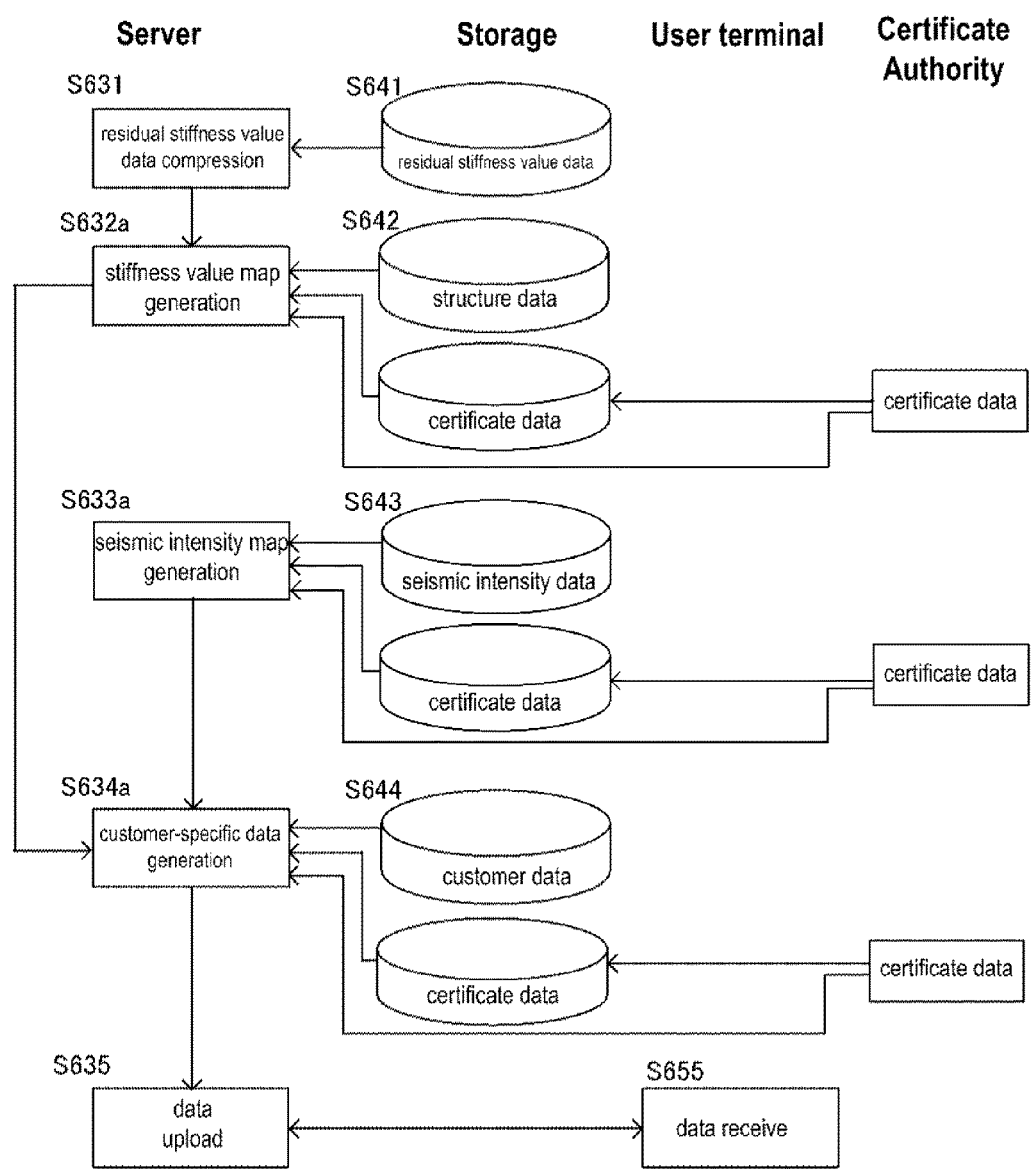
FIG. 15 A flowchart showing a map production in a twelfth embodiment.

FIG. 15 is a flowchart showing map production in a twelfth embodiment. In the residual seismic-resistant performance evaluation system of the eleventh embodiment described above, the stiffness value of the structure and the residual stiffness value may be used to produce a map on the stiffness value of the structure and a map on the residual stiffness value of the structure respectively. When each map is produced, the certificate data may be added to at least one of the stiffness value, the seismic intensity data and customer-specific data. Processing for adding the certificate data to each of the stiffness value of the structure, the seismic intensity data and the customer-specific data on each map will be described below.

As shown in FIG. 15, when the map of the stiffness value of the structure is generated, the certificate data is added to the stiffness value (S632a). Thereafter, when the seismic intensity map is generated, the certificate data is added to the seismic intensity data (S633a). Thereafter, when the customer-specific data is generated, the certificate data is added to each piece of map data (S634a). Steps S632a, S633a and S634a described above are performed, and thus it is possible to generate the stiffness value map and the seismic intensity map, to which the certificate data of the certificate authority is added, for each customer. In the residual seismic-resistant performance evaluation system of the twelfth embodiment, those pieces of data are disclosed on the network 50, and the certification is performed by using the added certificate data at the time of access from the user terminal 60, with the result that it is possible to utilize each piece of data that has enhanced reliability and safety. The users of the user terminal 60 may be classified into two or more groups, and for each of the classified users, accessible data on the stiffness value map, the seismic intensity map and the like may be controlled.

A VPN may be adopted on part or the whole of the network described above in order to suppress and detect spoofing, eavesdropping and tampering.

(Thirteenth Embodiment)

Figure 16:
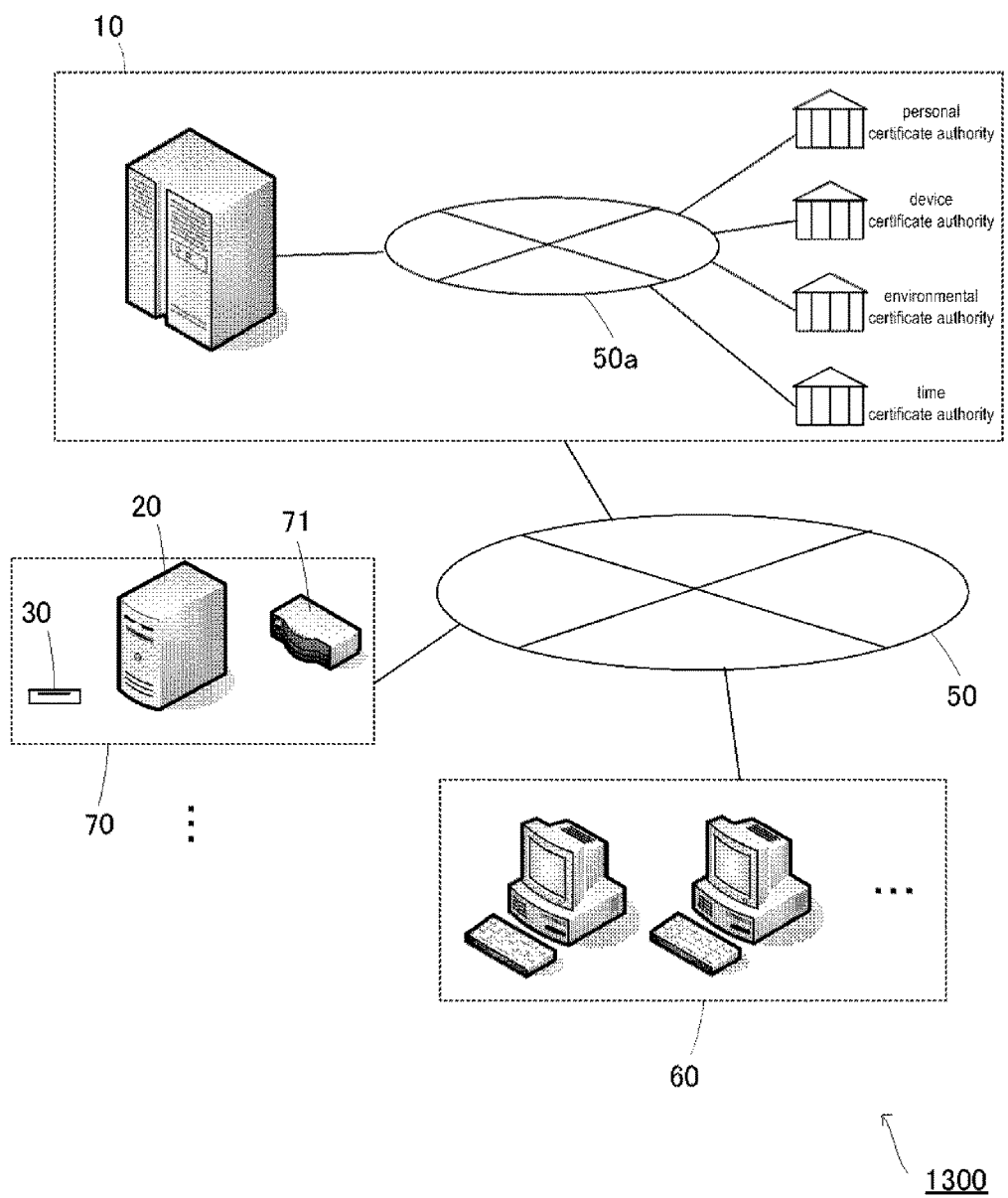
FIG. 16 A diagram showing the residual seismic-resistant performance evaluation system of a thirteenth embodiment.

FIG. 16 is a diagram showing the residual seismic-resistant performance evaluation system of the thirteenth embodiment. In the residual seismic-resistant performance evaluation system of the ninth to twelfth embodiments, the seismograph and the data processing terminal may be integrated. The residual seismic-resistant performance evaluation system 1300 includes the data processing server 10, the integrated terminal 70 in which the data processing terminal 20, the seismograph 30 and the communication module 71 are mainly integrated, the user terminal 60 and the individual certificate authorities (the personal certificate authority, the device certificate authority, the environmental certificate authority and the time certificate authority), and they are connected through networks 50 and 50a such as the Internet. The network 50a may be a LAN for locally connecting between the data processing server 10 and the individual certificate authorities.

By using the integration terminal 70 described above, it is not necessary to perform the network settings on the data processing terminal and the seismograph and to adjust the data processing terminal and the seismograph on-site, and it is possible to easily perform the installation. Further, when the integrated certification is performed, it is not necessary to certify the data processing terminal and the seismograph individually, with the result that it is possible to easily perform the certification. Then, the certificate data of each certificate authority is used, and thus the reliability and the safety are enhanced, with the result that it is possible to easily ensure that the operation is performed in an appropriate environment.

In the residual seismic-resistant performance evaluation system 1300 of the thirteenth embodiment, since the integration terminal 70 in which the data processing terminal and the seismograph are integrated is used, it is possible to easily perform the network settings and the installation, and the reliability and the safety are enhanced, with the result that it is possible to easily ensure that the operation is performed in an appropriate environment.

LIST OF REFERENCE SIGNS

10: Data processing server
11: CPU (central processing unit)
12: Storage device
13: Temporary storage means (RAM)
14: Network interface
20: Data processing terminal (Station)
21: CPU (central processing unit)
22: Storage device
23: Temporary storage means (RAM)
24: Network interface
30: Seismograph
31: CPU (central processing unit)
32: Storage device
33: Temporary storage means (RAM)
34: Network interface
35: A/D converter
36: Acceleration sensor
40: Storage server
50: Network (transmission path)
51: Network (LAN)
100, 800, 1300: residual seismic-resistant performance evaluation system

What is claimed is:

1. A residual seismic-resistant performance evaluation system comprising:
a seismograph that includes a seismic intensity sensor, a network interface, a storage, an A/D converter, a temporary storage means and a CPU, the seismic intensity senor detecting a tremor thereof by repeatedly sensing one of acceleration, velocity and displacement data thereof at a certain interval such that measurement data are acquired, the measurement data being composed with the sensed one of acceleration, velocity and displacement data;

a data processing terminal that is connected to the seismograph for recording and processing the measurement data that are acquired by and transmitted from the seismograph; and a data processing server that communicates with the data processing terminal through a network, wherein the data processing terminal is configured to perform:

a) calculating seismic intensity data based on the measurement data acquired by the seismograph (S124), the seismic intensity data being composed with either integers or symbols each of which indicates a magnitude of the tremor;

c) determining whether or not the seismic intensity data exceeds a threshold value, which is set by an operator in advance (S26);

d) transmitting the seismic intensity data exceeding the threshold value to the data processing server (S127), and y) transmitting the measurement data of which the seismic intensity data exceeds the threshold to the data processing server only when a request to transmit the measurement data is delivered from the data processing server, and the data processing server configured to perform :

x) receiving the seismic intensity data transmitted from the data processing terminal, g) creating and delivering the request to the data processing terminal to provide the measurement data (S231); and h) receiving the measurement data transmitted from the data processing terminal according to the request (S232).

2. The residual seismic-resistant performance evaluation system according to claim 1, further comprising:

a storage server, wherein the data processing server reads threshold value data recorded in the storage server, a predetermined threshold value adjustment is made on the threshold value and thereafter the adjusted threshold value is set in the data processing terminal.

3. The residual seismic-resistant performance evaluation system according to claim 2, wherein at the time that the storage server, the data processing server, the data processing terminal and the seismograph are started up, or periodically after the startup, each of the storage server, the data processing server, the data processing terminal and the seismograph performs one of a personal certificate and a device certificate and an environmental certificate and a time certificate.

4. The residual seismic-resistant performance evaluation system according to claim 3, wherein the data processing server updates an environment based on environmental certificate data stored in the storage server, in the following order: the storage server, the data processing server, the data processing terminal and the seismograph when the storage server, the data processing server, the data processing terminal or the seismograph is not certified as a result of any one of the certifications being performed.

5. The residual seismic-resistant performance evaluation system according to claim 1, wherein the data processing terminal is further configured to perform:

e) compressing the seismic intensity data exceeding the threshold value (S128); and f) storing the compressed seismic intensity data (S129).

6. The residual seismic-resistant performance evaluation system according to claim 1, wherein the data processing server is further configured to perform below before the performing g) of creating and delivering the request (S231):

i) changing a specification of the data processing server (S335).

7. The residual seismic-resistant performance evaluation system according to claim 1, wherein when the data processing server, the data processing terminal and the seismograph are started up, each of the data processing server, the data processing terminal and the seismograph performs one of a personal certificate, a device certificate and an environmental certificate.

8. The residual seismic-resistant performance evaluation system according to claim 7, wherein:

the data processing server updates environments based on environmental certificate data stored in the storage server, which are executed in the following order that are for the data processing server, for the data processing terminal and for the seismograph, when the data processing server, the data processing terminal or the seismograph is not certified as a result of any one of the certifications being performed.

9. The residual seismic-resistant performance evaluation system according to claim 1, wherein the data processing server is further configured to perform:

k) calculating displacement data based on the measurement data (S533);

l) calculating a natural period value from the displacement data (S534);

m) calculating a stiffness value from the natural period value (S535); and n) calculating a residual stiffness value from the stiffness value (S537).

10. The residual seismic-resistant performance evaluation system according to claim 9, wherein the data processing server further performs:

o) producing a seismic intensity map based on the seismic intensity data (S633);

p) producing a stiffness value map based on the residual stiffness value and structure data (S632); and q) uploading one of the seismic intensity map and the stiffness value map to a network server.

11. The residual seismic-resistant performance evaluation system according to claim 9, wherein when design data of a structure where the seismograph is placed is available, the stiffness value map of the structure is produced based on a design value thereof.

12. The residual seismic-resistant performance evaluation system according to claim 9, wherein the data processing server performs:

s) adding certificate data to at least one value of the displacement data, the natural period value, the stiffness value and the residual stiffness value which are calculated.

13. The residual seismic-resistant performance evaluation system according to claim 1, wherein the data processing terminal performs:

t) adding the certificate data to one of the measurement data and the seismic intensity data.

14. The residual seismic-resistant performance evaluation system according to claim 1, wherein
the seismograph stores the measurement data, and
the semismograph performs:
p) transmitting the measurement data to the data processing server only when the request to transmit the measurement data is delivered from the data processing server,
the data processing server performs:
r) creating and delivering the request to the seismograph to provide the measurement data; and
s) receiving the measurement data transmitted from the seismograph according to the request.

15. The residual seismic-resistant performance evaluation system according to claim 1, wherein
the data processing terminal is further equipped with a seismic intensity sensor, which has an identical function as the seismograph, in order to acquire the measurement data.

16. The residual seismic-resistant performance evaluation system according to claim 1, wherein
the data processing server performs the creating and delivering the request in the performing g) at the same time as the seismic intensity data exceeding the threshold value is received.

17. The residual seismic-resistant performance evaluation system according to claim 1, wherein
the data processing server performs the creating and delivering the request in the performing g) at a timing afterward the seismic intensity data exceeding the threshold value is received.

* * * * *